United States Patent
Nitta et al.

(10) Patent No.: US 7,337,394 B2
(45) Date of Patent: Feb. 26, 2008

(54) DIGITAL CONTENT PRODUCTION SYSTEM AND DIGITAL CONTENT PRODUCTION PROGRAM

(75) Inventors: Takashi Nitta, Chino (JP); Hirotaka Ohashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 970 days.

(21) Appl. No.: 10/108,375

(22) Filed: Mar. 29, 2002

(65) Prior Publication Data

US 2002/0144055 A1 Oct. 3, 2002

(30) Foreign Application Priority Data

Mar. 30, 2001 (JP) ............... 2001-101307

(51) Int. Cl.
*G06F 15/00* (2006.01)
*G06F 17/00* (2006.01)
(52) U.S. Cl. ............ 715/517; 715/518; 715/519; 715/520; 715/521; 715/539
(58) Field of Classification Search ......... 715/525, 715/517–521, 539
See application file for complete search history.

(56) References Cited

U.S. PATENT DOCUMENTS

| | | | | |
|---|---|---|---|---|
| 4,769,636 A | * | 9/1988 | Iwami et al. | 715/790 |
| 5,181,161 A | * | 1/1993 | Hirose et al. | 369/47.26 |
| 5,323,312 A | * | 6/1994 | Saito et al. | 715/513 |

(Continued)

FOREIGN PATENT DOCUMENTS

JP          A 58-144255          8/1983

(Continued)

OTHER PUBLICATIONS

Adobe Creative Team, "Adobe PageMaker 6.5 Classroom In A Book," Adobe Press, May 16, 1997, Lesson 3, downloaded from: http://proquest.safaribooksonline.com/JVXSL.asp, downloaded pages: title—copyright page, and pp. 1-26.*

(Continued)

*Primary Examiner*—William Bashore
(74) *Attorney, Agent, or Firm*—Oliff & Berridge, PLC

(57) ABSTRACT

The invention provides a digital content production system which is appropriate for use in preventing a layout intended by a designer from being destroyed and provides freedom in the order of posting information. A content delivery terminal processes a flow object using a flow management table when a text information storage frame is not sufficient to fully store text information. A record of a flow object that is overflowed for the first time is registered at the end of the flow management table, and an unprocessed flow object is processed, starting with the top of the flow management table. If the text information is overflowed again from a new information storage frame as a result of processing the unprocessed flow object, the record of that flow object is registered on the top of the flow management table as an exception.

13 Claims, 22 Drawing Sheets

U.S. PATENT DOCUMENTS

| | | | | |
|---|---|---|---|---|
| 5,379,373 A | * | 1/1995 | Hayashi et al. | 715/513 |
| 5,381,523 A | * | 1/1995 | Hayashi | 715/513 |
| 5,633,996 A | * | 5/1997 | Hayashi et al. | 715/513 |
| 5,758,257 A | * | 5/1998 | Herz et al. | 725/116 |
| 5,835,916 A | * | 11/1998 | Inaki et al. | 715/509 |
| 5,860,073 A | * | 1/1999 | Ferrel et al. | 715/522 |
| 6,021,416 A | * | 2/2000 | Dauerer et al. | 715/501.1 |

FOREIGN PATENT DOCUMENTS

| | | |
|---|---|---|
| JP | A 64-040363 | 2/1989 |
| JP | A 64-088771 | 4/1989 |
| JP | A-01-185761 | 7/1989 |
| JP | A 02-003863 | 1/1990 |
| JP | A 04-181462 | 6/1992 |
| JP | A 5-286107 | 11/1993 |

OTHER PUBLICATIONS

Camarda, et al., "Special Edition Using Microsoft Word 2000," "Linking Text Boxes," Que, May 6, 1999, downloaded from: http://proquest.safaribooksonline.com/JVXSL.asp, downloaded pp. 1-6.*

Adobe Press, May 16, 1997, Lesson 3, downloaded from: http://proquest.safaribooksonline.com/JVXSL.asp, downloaded pages: title—copyright page, and pp. 1-26, previously sent to Applicants.*

Japanese Unexamined Patent Application Publication No. 63-009580, Applicant admited prior art.*

Ichitaro 8 for Windows 95/NT; Ichitaro Digest; May 8, 1997; p. 126 (with English translation).

* cited by examiner

300 USER PROFILE TABLE

| USER ID | DESTINATION ADDRESS | CATEGORY NO. | KEYWORD | DATE OF DELIVERY | TIME OF DELIVERY | LAYOUT NO. | MAXIMUM NO. OF PAGES | FONT SIZE |
|---|---|---|---|---|---|---|---|---|
| Andy | Andy@aaa.com | 1700 | PROCESSOR | EVERYDAY | 5 | 2 | 2 | SMALL |
| Bill | Bill@bbb.com | 1501 | OS | WEEKDAY | 11 | 5 | 2 | SMALL |
| Candy | Candy@ccc.com | 201* | APPLICATION | WEEKEND | 9 | 6 | u | STANDARD |

| 302 | 304 | 306 | 308 | 310 | 312 | 314 | 316 | 318 |

FIG.4

400 FLOW MANAGEMENT TABLE

| DOCUMENT NO. | OVERFLOW POSITION | PAGE NO. OF OVERFLOW SOURCE | STORAGE PAGE NO. OF FLOW OBJECT | FINISH FLAG |
|---|---|---|---|---|
| | | | | |
| | | | | |
| | | | | |
| | | | | |

DIGITAL CONTENT PRODUCTION SYSTEM AND DIGITAL CONTENT PRODUCTION PROGRAM

BACKGROUND OF THE INVENTION

1. Field of Invention

The present invention relates to a system for producing a digital content and a program for use in such a system. More particularly, the present invention relates to a digital content production system which is appropriate for use in preventing a layout intended by a designer from being destroyed, and permits a high degree of freedom in setting the order of posting information.

2. Description of Related Art

Currently, digital content delivery systems for providing users with digital contents, such as news, have been available. In such a digital content delivery system, several digital contents are read from a content registration data base (hereinafter the data base is simply referred to as DB), the read digital content is edited, and the edited digital content is then delivered to a user. In the editing process of the digital content, the digital content is edited in an easy-to-see layout to users. Available techniques to do such layout are described in a document organization method disclosed in Japanese Unexamined Patent Application Publication No. 62-054111 (hereinafter referred to as a first conventional art), a document organizing apparatus disclosed in Japanese Unexamined Patent Application Publication No. 63-009580 (hereinafter referred to as a second conventional art), and an electronic document display device disclosed in Japanese Unexamined Patent Application Publication No. 2-880789 (hereinafter referred to as a third conventional art).

In accordance with the first conventional art, a format in which a logical structure of an input document analyzed by a logical structure analyzing unit can be developed and an organization rule dictating the format are stored in an organization rule dictionary, and an organization processor unit determines the application of the organization rule. For example, when a document having a predetermined format is developed, the organization processor unit calculates an excess portion or a deficient portion on a designated page, selects and applies an optimum organization rule in response to the calculation result, and modifies the format of the document development so that the document data is accommodated within the designated number of pages. In this way, an optimum document structure falling within a predetermined number of pages can be selected.

In the second conventional art, since an area information storage unit stores area information that identifies per page an assignment area responsive to the structural attribute of document data, a document organizing unit determines which document data to assign to which area, based on the area information and the structural attribute information of the document data. An output monitoring unit detects a mismatch between the document data assigned to one area by the document organizing unit and the area information, and an area information correction unit corrects the storage content in the area information storage unit to resolve the mismatch. Matching between the document data and the area information is thus established, and an easy-to-read professional-looking document is automatically organized.

The third conventional art can include information storage device for storing interests and knowledge of a plurality of users as page space organization information intended for individuals, a learning device for learning the page space organization information intended for individuals from history of searches performed by each user, a screen control device which operates a screen to obtain the page space organization information for individuals, obtains, from a data base, document information for each user based on the page space organization information for individuals, and reorganizes the document information, and displays the reorganized document information, and management device for managing the information storage device, the learning device, and the screen control device.

SUMMARY OF THE INVENTION

If a digital content is mechanically laid out in an editing process thereof, legibility and good appearance may be destroyed, and for this reason, a designer designs beforehand several templates for layout so that the digital content is edited to the layout intended by the designer based on the layout template. In this case, the digital content is desirably edited to the layout intended by the designer, regardless of the content, the amount, and the logical structure of the information to be posted.

In the first conventional art, however, there is a possibility that the layout intended by the designer is destroyed depending on the amount of the document data, because the format of the document development is modified to accommodate the document data within a specified number of pages.

In the second conventional art, since an area to which the document data should be allocated is determined based on the area information and the structural attribute information of the document data, a document having a proper size is allocated to each area, and the document data is laid out as the designer intends to some degree. However, since each document is assigned to a respective location, it is difficult for a user or a deliverer to determine the order of posting the documents when document data contains a plurality of documents. For example, it is desired that the documents be posted in the order that satisfies the preference and interests of the user's, but the second conventional art fails to meet such a requirement. The degree of freedom permitted in the setting of the posting order of the information can be very limited.

In the third conventional art, the document information for each user is acquired from the data base based on the page space organization information for individuals, and is reorganized. Like in the first conventional art, the layout intended by the designer may be destroyed depending on the amount of document information.

The present invention has been developed to resolve the unresolved problems of the conventional art. It is an object of the present invention to provide a digital content production system and a digital content production program, which are appropriate for use in preventing a layout intended by a designer from being destroyed, and present a high degree of freedom in the posting order of information.

To achieve the mentioned goal, a digital content production system of the present invention can include a content storage device for storing registered digital contents, a content selection device for selecting a digital contents for arrangement in the content storage device, a content production device for producing a digital content for output by determining an output layout of the digital contents for arrangement selected by the content selection device. The content production device produces the digital content for output by arranging information to be posted forming the digital contents for arrangement in a layout area in accordance with a predetermined frame. Furthermore, the content production device produces the digital content for output by storing the information to be posted in a plurality of information storage frames, arranged in the layout area, for storing the information to be posted, and when the information storage frames are not sufficient enough to store the information to be posted, a portion of the information to be posted that cannot be stored into the information storage frames arranged in the layout area is stored into another information storage frame different from the information storage frames.

In this arrangement, the content selection device selects the digital contents for arrangement in the content storage device, and the content production device arranges the information to be posted forming the selected digital contents for arrangement in the layout area in accordance with the predetermined frame. The digital content for output is thus produced.

In the layout process, the content production device stores the information to be posted in the plurality of information storage frames arranged in the layout area. When the information storage frames fail to entirely accommodate the information to be posted with a portion thereof overflowed, the overflowed portion is stored into another information storage frame different from the information storage frames.

The information storage frame may be dynamically arranged in the layout area when the digital contents for arrangement is laid out. Alternatively, the information storage frame may be arranged in the layout area based on layout definition information which is prepared beforehand and defines the state that the plurality of information storage frames is arranged in the layout area. The same is true of a digital content production program.

The content storage device can store the registered digital content by any technique at any time. The content storage device may store beforehand the registered digital content, alternatively, without storing beforehand the registered digital content, the content storage means stores the registered digital content when it is input from the outside during the operation of the system. The same is true of the digital content production program.

The system may be embodied in a single apparatus, or in a network system in which a plurality of terminals is connected to each other to allow communication. In the latter case, each component of the system can be included in any of the terminals as long as the components remain able to communicate to each other.

The output layouts include a display layout according to which the digital content for output is presented on a screen, and a print layout according to which the digital content for output is printed out on a sheet of paper. The same is true of the digital content production program.

In the digital content production system of the present invention, wherein the content production device produces the digital content for output containing a plurality of layout areas on a one area per page basis by storing the information to be posted in the plurality of information storage frames, and when the information storage frames are not sufficient to store the information to be posted, an overflowed portion of the information to be posted is stored into another information storage frame on a page different from the page to which the information storage frames belong.

In this arrangement, the content production device stores the information to be posted in the plurality of information storage frames arranged in the layout area in the layout process. When the information storage frames fail to entirely accommodate the information to be posted with a portion thereof overflowed, the overflowed portion of the information to be posted is stored into another information storage frame on a page different from the page to which the information storage frames belong.

In the digital content production system of the present invention, wherein, when the information storage frames are not sufficient to store the information to be posted, the overflowed portion of the information to be posted is stored into another information storage frame on a page arranged behind the page to which the information storage frames belong.

In this arrangement, the content production device stores the information to be posted in the plurality of information storage frames arranged in the layout area in the layout process. When the information storage frames are not sufficient to store the information to be posted with a portion thereof overflowed, the overflowed portion is stored into another information storage frame on a page subsequent to the page to which the information storage frames belong.

In the digital content production system of the present invention, further including table storage device for storing a flow management table that manages the overflowed portion of the information to be posted. The flow management table registers, per overflowed portion, identification information for identifying the overflowed portion of the information to be posted and front position information for identifying the front position of the overflowed portion of the information to be posted with the identification information associated with the front position information. When the information storage frames are not sufficient to store the information to be posted, the content production device registers the identification information and the front position information of the overflowed portion of the information to be posted in the flow management table. Also, when the overflowed portion of the information to be posted is stored into another information storage frame, the identification information and the front position information are read from the flow management table, and the overflowed portion is stored into the information storage frame on a different page, based on the read identification information and the read front position information.

In this arrangement, when the information storage frames fail to fully accommodate the information to be posted with the portion thereof overflowed, the content production device registers the identification information and front position information of the overflowed portion of the information to be posted in the flow management table. When the overflowed portion is stored into another information storage frame, the content production device reads the identification information and the front position information from the flow management table, and the overflowed portion of the information to be posted is stored into the information storage frame on the different page based on the read identification information and front position information.

The table storage device stores the flow management table by any technique at any time. The table storage device stores the flow management table beforehand. Alternatively, the table storage device may dynamically generate and store a flow management table during the operation of the system, rather than storing beforehand the flow management table.

In the digital content production system of the present invention, wherein the content production device performs the registration operation with respect to the flow management table starting from the end thereof while performing the reading operation starting from the top of the flow management table.

In this arrangement, when the information storage frames are not sufficient to store the information to be posted with the portion thereof overflowed, the content production device registers the identification information and front position information of the overflowed portion of the information to be posted at the end of the flow management table. On the other hand, the content production device reads the identification information and front position information from the top of the flow management table, when the overflowed portion of the information to be posted is stored into another information storage frame.

In the digital content production system of the present invention, wherein the content production device performs the registration operation from the top of the flow management table at the second or more time of registering the overflowed portion of the same information to be posted into the flow management table.

In this arrangement, the content production device registers the identification information and front position information not at the end but the top of the flow management table at the second or more time of registering the overflowed portion of the same information to be posted.

In the digital content production system of the present invention, wherein the flow management table registers finish information indicating whether the storage of the overflowed portion is completed, in addition to the identification information and the front position information with the finish information associated with the identification information and the front position information. The content production device sets the finish information into a state that represents that the storage of the overflowed portion is completed when the end of the overflowed portion has been stored into the information storage frame. Also, when the overflowed portion is being stored into the information storage frame, the identification information and the front position information, corresponding to the finish information yet to indicate a state that the storage of the overflowed portion is completed, are read from the flow management table.

In this arrangement, when the end of the overflowed portion of the information to be posted is stored into the information storage frame, the content production device sets the finish information to the state that indicates that the storage of the overflowed portion is completed. On the other hand, when the overflowed portion of the information to be posted is stored in the information storage frame, the identification information and the front position information, corresponding to the finish information yet to indicate a state that the storage of the overflowed portion of the information to be posted is completed, are read from the flow management table by the content production device.

In the digital content production system of the present invention, further including layout definition information storage device for storing layout definition information that defines a state in which the plurality of information storage frames are arranged in the layout area. If an unprocessed overflowed portion of the information to be posted not stored in the information storage frames is still present when the information to be posted is arranged in all layout areas defined by the layout definition information stored in the layout definition information storage device, the content production device adds a new layout area, arranges another information storage frame in the newly added layout area, and stores the unprocessed overflowed portion of the information to be posted in the arranged information storage frame.

In this arrangement, if the unprocessed overflowed portion of the information to be posted not stored in the information storage frames is still present when the information to be posted is arranged in all layout areas defined by the layout definition information stored in the layout definition information storage means, the content production device adds the new layout area, arranges the information storage frame in the newly added layout area, and stores the unprocessed overflowed portion of the information to be posted in the arranged information storage frame.

The layout definition information storage device can store the layout definition information by any technique at any time. The layout definition information storage device stores beforehand the layout definition information. Alternatively, the layout definition information storage device may store the layout definition information input from outside during the operation of the system, rather than storing beforehand the layout definition information.

In the digital content production system of the present invention, wherein the content production means repeats the addition, the arrangement, and the storage until no unprocessed overflowed portion of the information to be posted is present. In this arrangement, the content production device can repeat a series of process steps of adding the new layout area, arranging the information storage frame in the newly added layout area, and storing the overflowed portion of the information to be posted in the arranged information storage frame until no unprocessed overflowed portion of the information to be posted is present.

In the digital content production system of the present invention, wherein the plurality of information storage frames includes a overflowed-information storage frame dedicated to storing an overflowed portion of the information to be posted therewithin. In this arrangement, the content production device stores the overflowed portion of the information to be posted in the dedicated overflowed-information storage frame.

In the digital content production system of the present invention, wherein the content production device stores the overflowed portion of the information to be posted in the dedicated overflowed-information storage frame before storing the information to be posted in the plurality of information storage frames other than the dedicated overflowed-information storage frame on the same page. In this arrangement, the content production device stores the information to be posted in the plurality of information storage frames other than the dedicated overflowed-information storage frame after storing the overflowed portion of the information to be posted in the dedicated overflowed-information storage frame on the same page.

In the digital content production system of the present invention, further including user information storage device for storing user information relating to a user, wherein the content selection device selects the digital contents for arrangement in the content storage device in accordance with the user information in the user information storage device.

In this arrangement, the content selection means selects the digital contents for arrangement in the content storage means in accordance with the user information in the user information storage device.

The user information can include the age, the sex, the interests and preference, the home address, and the name of the user, and the operational environment of a user terminal. For example, the user information storage device can store the user information by any technique at any time. The user information storage device stores beforehand the user information. Alternatively, the user information storage device may store the user information input from outside during the operation of the system, rather than storing beforehand the user information.

In the digital content production system of the present invention, further including user information storage device for storing user information relating to a user, wherein the content production device determines an output layout of the digital contents for arrangement selected by the content selection device, in accordance with the user information in the user information storage device.

In this arrangement, the content production device determines the output layout of the digital contents for arrangement selected by the content selection device, in accordance with the user information in the user information storage device.

Suppose that output layout is determined based on the user information and, for example, when the age information, if included in the user information, indicates that the user is an aged person, a relatively large font may be used. When the sex information, if included in the user information, indicates that the user is a female, a rounded font may be employed. If the preference and interest information is included in the user information, the layout can be like that of magazines intended for children, that of sport papers, or that of technical documents. If the user information includes the home address of the user, the layout may be presented with scenery corresponding to the location of the address as a background. If the user information includes the name of the user, the layout may have the name on it as the title thereof. When the operational environment information relating to the user terminal, if included in the user information, indicates that the capacity of a RAM in the user terminal is small, the layout may be designed so that the amount of data of the image thereof is also small.

On the other hand, to achieve the above object, the digital content production program of the present invention, can be a program which enables the digital content production system described above including a computer system to perform a process to be achieved by the content production device. The content production device produces the digital content for output by storing the information to be posted in the plurality of information storage frames for storing the information to be posted, the information storage frames arranged in the layout area. When the information storage frames are not sufficient to store the information to be posted, the overflowed portion of the information to be posted not stored in the information storage frames is stored into another information storage frame different from the information storage frames.

In this arrangement, the digital content production system reads the program, and executes the process in accordance with the read program. The program can thus have the same advantage as that of the digital content production system.

BRIEF DESCRIPTION OF THE DRAWINGS

The invention will be described with reference to the accompanying drawings, wherein like numbers reference like elements, and wherein:

FIG. 4 illustrates the data structure of a user profile table 300;

FIG. 8 illustrates the data structure of a flow management table 400;

DETAILED DESCRIPTION OF PREFERRED EMBODIMENTS

Figure 1:
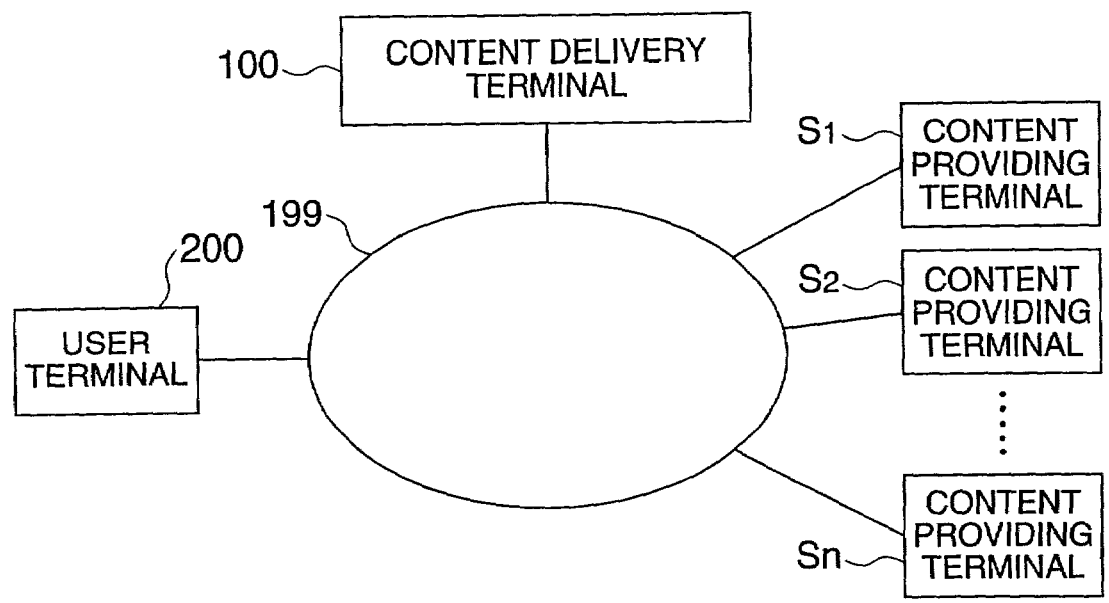
FIG. 1 is a block diagram illustrating the construction of a network in which the present invention is implemented.

An embodiment of the present invention is discussed hereinafter referring to the drawings. FIGS. 1 through 23 show embodiments of a digital content production system and a digital content production program of the present invention. In the exemplary embodiment, the digital content production system and the digital content production program of the present invention are employed for a content delivery terminal 100 to deliver a digital content, such as news, to a user terminal 200 as FIG. 1 shows.

The construction of a network system implementing the present invention is discussed referring to FIG. 1. FIG. 1 is an exemplary block diagram showing the construction of the network system implementing the present invention.

Connected to the Internet 199 are a plurality of content providing terminals $S_1$-$S_n$ for providing digital contents, the content delivery terminal 100 for collecting and delivering digital contents provided by the content providing terminals $S_1$-$S_n$ and the user terminal 200 used by a user as shown in FIG. 1. Although a single user terminal 200 is shown for simplicity, a plurality of user terminals can actually connected to the Internet 199.

Each of the content providing terminals $S_1$-$S_n$, can include the same function as a typically available computer composed of a CPU, an ROM, an RAM, and an I/F, all of these interconnected through a bus. When the content providing terminal produces a digital content, the terminal adds a category number to the digital content to identify a category of the digital content, and transmits the digital content to the content delivery terminal 100. The category number will be discussed in more detail later.

The user terminal 200 can include the same function of a typically available computer composed of a CPU, an ROM, an RAM, and an I/F, all of these interconnected through a bus. The user terminal 200 can also be equipped with a WWW (World Wide Web) browser, and accesses the content delivery terminal 100 using the WWW browser.

Figure 2:
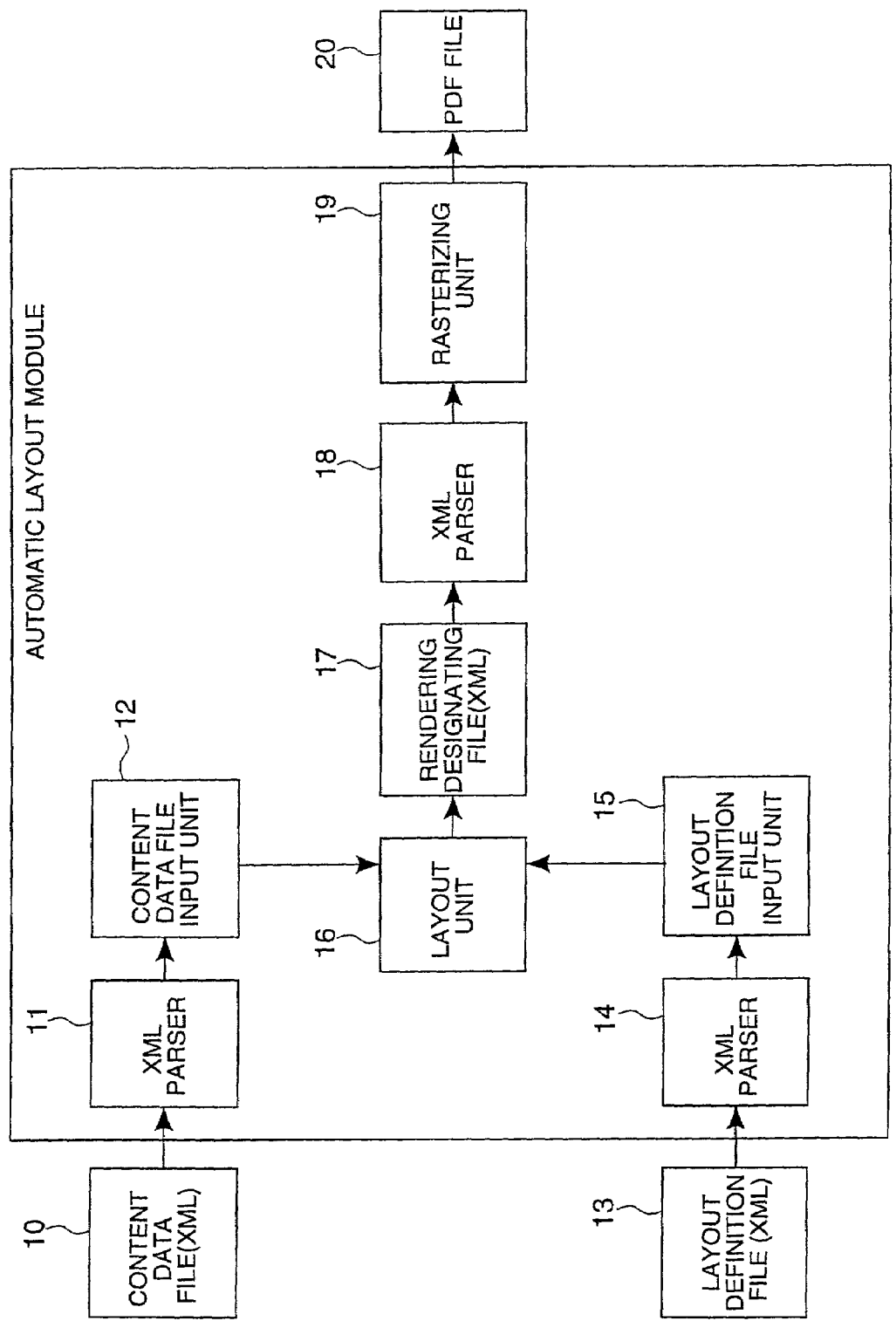
FIG. 2 is a functional block diagram illustrating the function of a content delivery terminal 100.

The function of the content delivery terminal 100 will now be discussed in detail, referring to FIG. 2. FIG. 2 is an exemplary block diagram showing the function of the content delivery terminal 100.

Referring to FIG. 2, the content delivery terminal 100 can include an XML parser 11 for analyzing a content data file 10 in an XML (eXtensive Markup Language), a content data file input unit 12 for inputting the content data file 10 analyzed by the XML parser 11, an XML parser 14 for analyzing an XML layout definition file 13, a layout definition file input unit 15 for inputting the layout definition file 13 analyzed by the XML parser 14, a layout unit 16 for performing a layout process based on the content data file 10 and the layout definition file 13 respectively received through the input units 12 and 15, an XML parser 18 for analyzing an XML rendering designating file 17 from the layout unit 16, and a rasterizing unit 19 for producing a file 20 in a PDF (Portable Document Format) by performing rendering based on the rendering designating file 17 analyzed by the XML parser 18. Particularly, the feature of the embodiment of the present invention lies in the layout unit 16 among other components.

Figure 3:
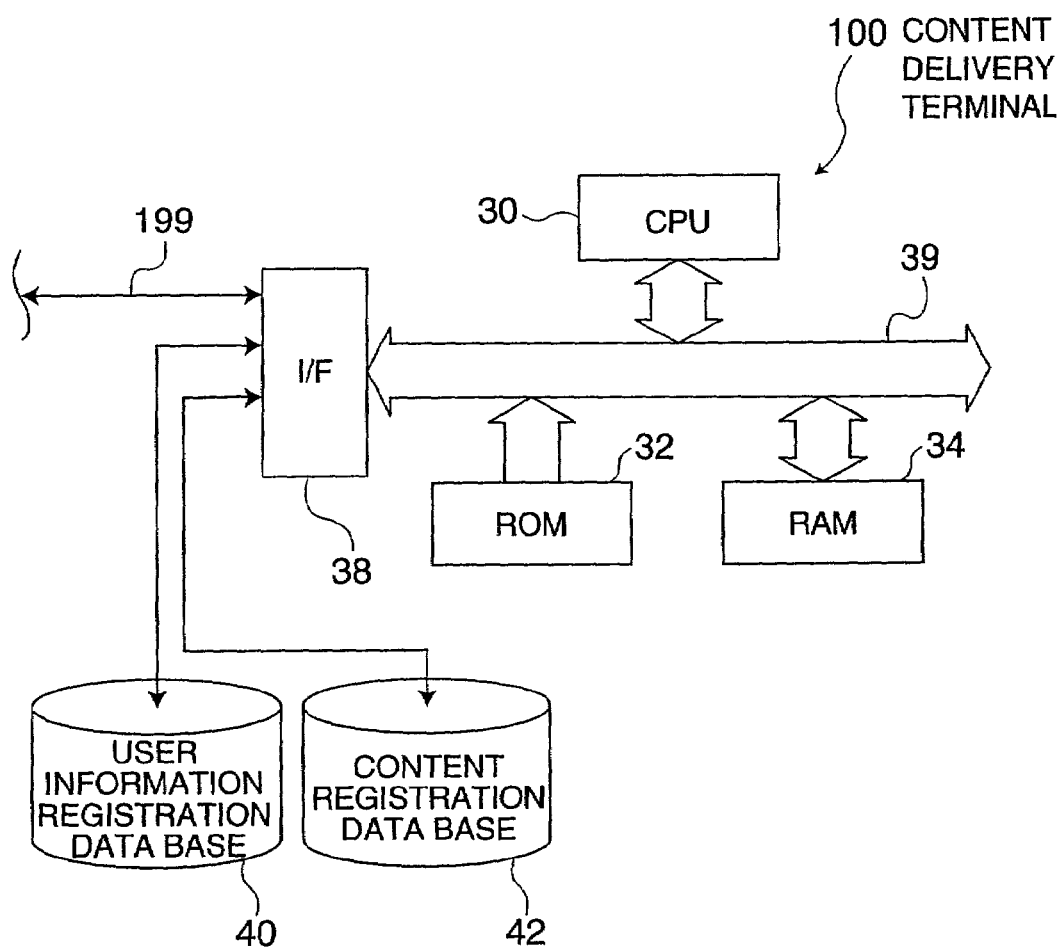
FIG. 3 is a block diagram illustrating the construction of the content delivery terminal 100.

Referring to FIG. 3, the content delivery terminal 100 will now be discussed in detail. FIG. 3 is an exemplary block diagram of the content delivery terminal 100.

Referring to FIG. 3, the content delivery terminal 100 can include a CPU 30 for performing arithmetic operation and controlling the entire system based on a control program, an ROM 32 for storing beforehand the control program, etc., of the CPU 30 in a predetermined area thereof, an RAM 34 for storing data read from the ROM 32 or the like and calculation results required in the course of the arithmetic operation of the CPU 30, and an I/F 38 for interfacing with an external device for exchange of data. To exchange data, these components are mutually interconnected by a bus 39, as a signal line for transferring data.

Connected to the I/F 38 are, as external units, a user information registration data base DB 40 for registering user information, a content registration data base DB 42 for storing digital contents supplied by content providing terminals $S_1$-$S_n$, and a signal line with which to connect to the Internet 199.

The data structure of the user information registration data base DB 40 is discussed in detail below with reference to FIG. 4. Referring to FIG. 4, the user information registration data base DB 40 stores a user profile table 300. FIG. 4 shows an exemplary data structure of the user profile table 300.

The user profile table 300 registers a single or a plurality of records for each user as shown in FIG. 4. Each record includes a field 302 for registering a user ID for identifying a user, a field 304 for registering a destination address of a digital content, a field 306 for registering a category number, a field 308 for registering a keyword, a field 310 for registering a date of delivery, a field 312 for registering time of delivery, a field 314 for registering a layout number, a field 316 for registering a maximum number of pages, and a field 318 for registering a font size.

When a digital content containing a keyword designated by a user is selected as data to be delivered, the field 308 registers that keyword. The keyword may be the one that appears most frequently in the articles of a category in which the user is interested. Referring to FIG. 4, a "PROCESSOR" is registered in a first row of the field 308, and an "OS" is registered in a second row of the field 308

The field 310 registers a date of delivery on which the user desires the delivery of the digital content. For example, when the everyday delivery of the digital content is desired, "EVERYDAY" is designated. When the weekday-only delivery of the digital content is desired, a "WEEKDAY" is designated. When the weekend delivery of the digital content is desired, a "WEEKEND" is designated. Referring to FIG. 4, "EVERYDAY" is registered in a first row of the field 310, and a "WEEKDAY" is registered in a second row of the field 310.

The field 312 registers the time of delivery of the digital content on the delivery date designated by the user. As the time of delivery, one day may be divided into 24 hours from zero to twenty-third hour, and any hour may be designated. Referring to FIG. 4, a fifth hour is registered in a first row of the field 312, and an eleventh hour is registered in a second row in the field 312.

The field 314 registers the layout number for identifying the output layout of the digital content. For example, the layout number identifies the output layout desired by the user. Referring to FIG. 4, layout number 2 is registered in a first row of the field 314, and layout number 5 is registered in a second row of the field 314. The layout number will be discussed in greater detail below.

The field 316 registers the maximum number of pages as the upper limit for the digital content to be displayed or printed out. The maximum number of pages designates the maximum numbers of pages as the upper limit. Alternatively, the letter "u" may be designated to set no upper limit. Referring to FIG. 4, "2" pages are registered in a first row of the field 316, and the letter "u" is registered in a third row of the field 316.

The field 318 registers the size of a font when the digital content is displayed or printed out. Referring to FIG. 4, a "SMALL" font is registered in a first row of the field 318, and a "STANDARD" font is registered in a third row of the field 318.

Figure 5:
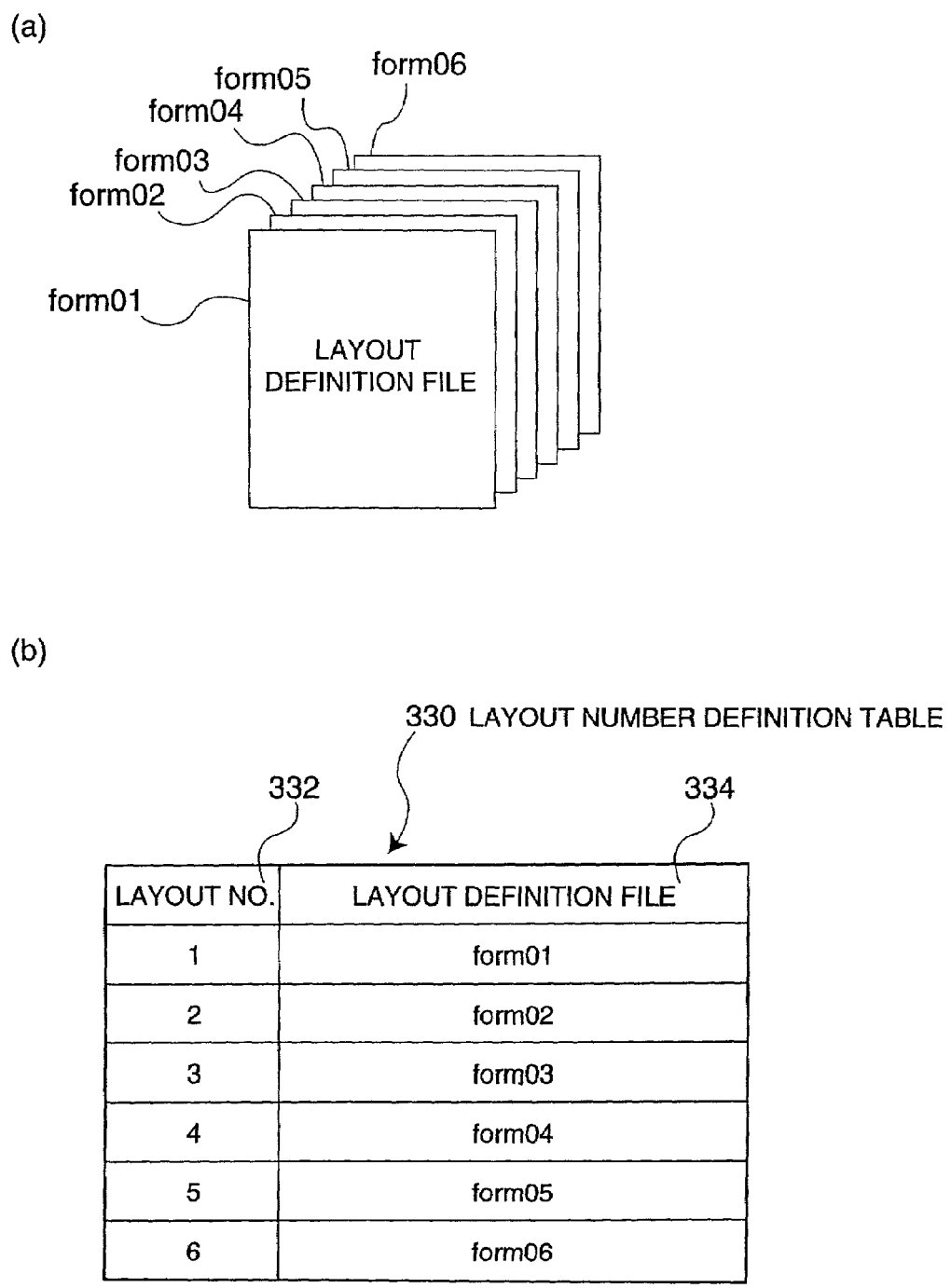
FIG. 5 illustrates a layout definition file and the data structure of a layout number definition table 330.

Referring to FIG. 5, the user information registration DB 40 stores a plurality of layout definition files form01-form06 defining the output layout of the digital contents, and a layout number definition table 330 for indicating the correspondence between the layout definition files form01-form06 and the layout numbers. FIG. 5 shows the layout definition file and the data structure of the layout number definition table 330.

The layout definition files form01-form06 define a text information storage frame for accommodating text information, the size and layout position of a image contained in the digital content in a printing sheet, the size, the type and color of a font of the text information, a character pitch and a line pitch, and the number of, the quality of, the size of, and the ratio of images. The layout definition files are defined by the XML, etc.

Referring to FIG. 5(b), the layout number definition table 330 registers a single record for each layout number. Each record includes a field 332 for registering the layout number, and a field 334 for registering a file name of the layout definition file. As shown in FIG. 5(b), a first record registers "1" as a layout number, and "form01" as a layout definition file name, and a second record registers "2" as a layout number, and "form02" as a layout definition file name.

Figure 6:
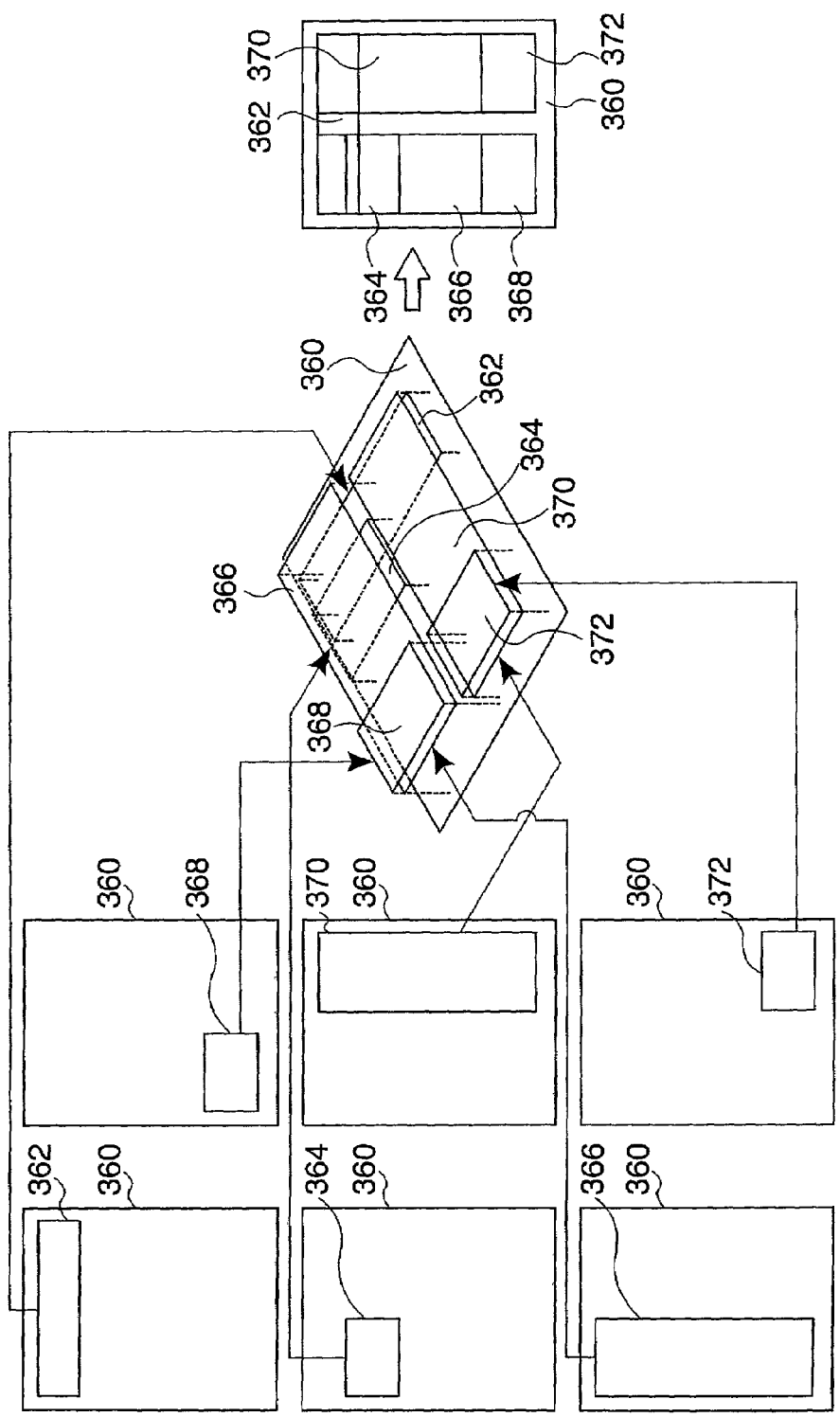
FIG. 6 illustrates a part of the data structure of the layout definition file.
Figure 7:
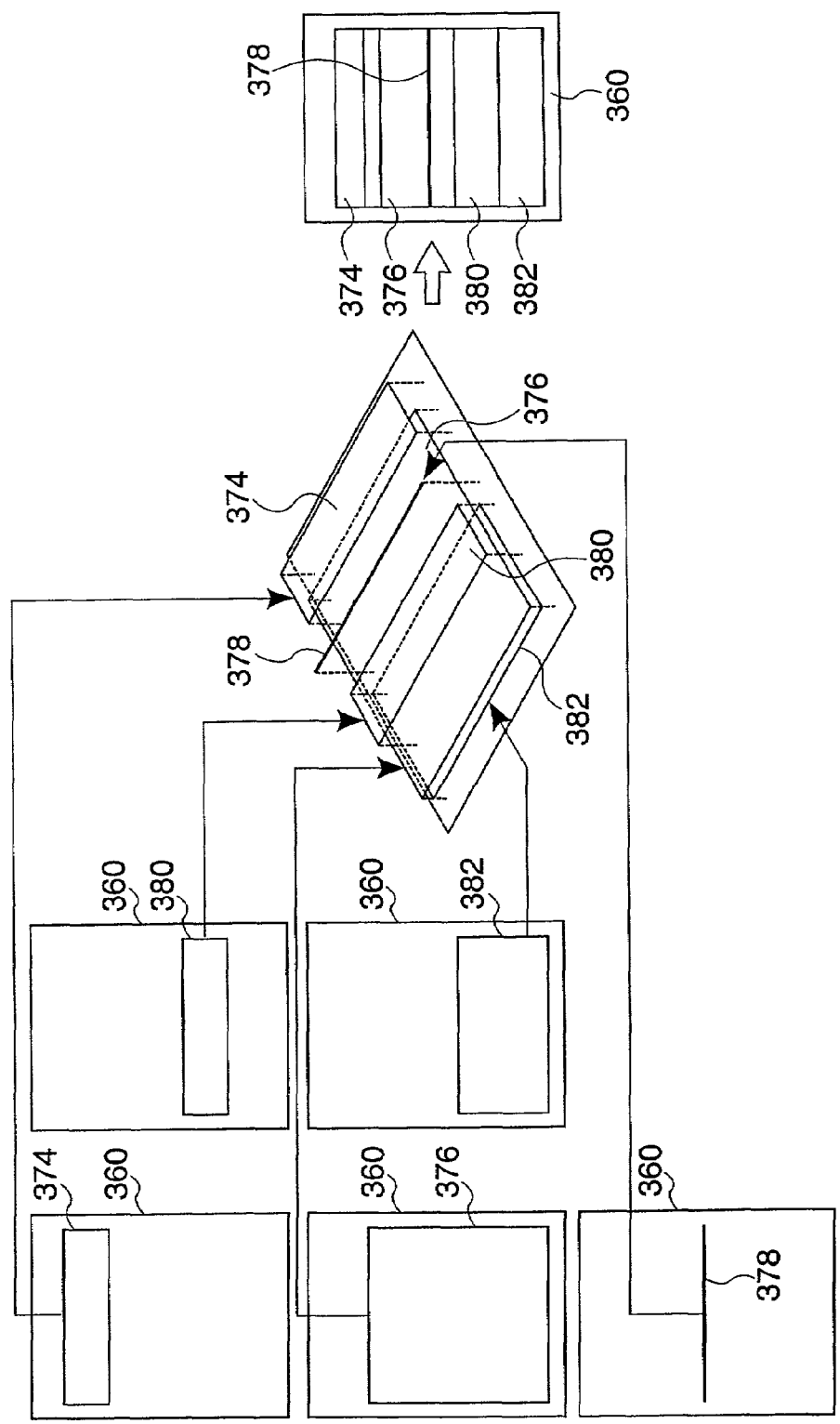
FIG. 7 illustrates a part of the data structure of the layout definition file.

The data structure of the layout definition files form01-form06 is discussed hereinafter with reference to FIGS. 6 and 7. FIGS. 6 and 7 show a portion of the data structure of the layout definition file. The layout definition files form01-form06 are different from each other in data structure, and two typical files are now discussed.

Each of the layout definition files form01-form06 includes a layout area 360 on each page. Referring to FIG. 6, one layout area 360 includes a title information storage frame 362 for storing title information, a image information storage frame 364 for storing image information, a text information storage frame 366 for storing text information, a image information storage frame 368, a text information storage frame 370, and a flow object storage frame 372 for storing a flow object. The flow object here refers to a portion of text information and other information which is not stored in and overflowed from a page preceding a current page. Hereinafter, a piece of information such as text information or any other piece of information, which is overflowed, is generally called an object.

The title information storage frame 362 has a rectangular outline with a width horizontally extending almost fully across the layout area 360 and a height about one-fifth the height of the layout area 360, and is positioned with the top left corner thereof close to the top left corner of the layout area 360. The image information storage frame 364, the text information storage frame 366, and the text information storage frame 370 overlap the title information storage frame 362.

The image information storage frame 364 has a rectangular outline with a width horizontally extending across about half the layout area 360 and a height about one-quarter the overall height of the layout area 360. The image information storage frame 364 is positioned such that in comparison with the top left corner of the title information storage frame 362, the top left corner of the image information storage frame 364 is located at the same place in the horizontal direction while being located slightly lower in the vertical direction. The title information storage frame 362, the image information storage frame 364, and the text information storage frame 366 overlap each other.

The text information storage frame 366 has a rectangular outline with a width horizontally extending across about half the layout area 360 and a height almost as high as the full height of the layout area 360. The text information storage frame 366 is arranged with the top left corner thereof aligned with the top left corner of the title information storage frame 362. The text information storage frame 366, the title information storage frame 362, the image information storage frame 364, and the image information storage frame 368 overlap one another.

The image information storage frame 368 has a rectangular outline with a width extending across about half the layout area 360 and a height about one-quarter the full height of the layout area 360. The image information storage frame 368 is positioned with the bottom left corner thereof aligned with the bottom left corner of the text information storage frame 366. The image information storage frame 368 overlaps the text information storage frame 366.

The text information storage frame 370 has a rectangular outline with a width horizontally extending across half the layout area 360, and a height almost as high as the full vertical height of the layout area 360. The text information storage frame 370 is positioned with the top right corner thereof aligned with the top right corner of the title information storage frame 362, and overlaps the title information storage frame 362, and the flow object storage frame 372.

The flow object storage frame 372 has a rectangular outline with a width horizontally extending across about half the layout area 360, and a height about one-quarter the height of the layout area 360. The flow object storage frame 372 is positioned with the bottom right corner thereof aligned with the bottom right corner of the text information storage frame 370, and overlaps the text information storage frame 370.

Referring to FIG. 7, another layout area 360 includes a title information storage frame 374, a text information storage frame 376, a title information storage frame 380, a text information storage frame 382, a partitioning line 378 indicating a partition between the text information storage frame 376 and the text information storage frame 382.

The title information storage frame 374 has a rectangular outline with a width horizontally, almost fully extending across the layout area 360, and a height about one-fifth the height of the layout area 360. The title information storage frame 374 is positioned with the top left corner thereof in the vicinity of the top left corner of the layout area 360, and overlaps the text information storage frame 376.

The text information storage frame 376 has a rectangular outline with a width horizontally, almost fully across the layout area 360, and a height about four-fifths the height of the layout area 360. The text information storage frame 376 is positioned with the bottom left corner thereof in the vicinity of the bottom left corner of the layout area 360. The text information storage frame 376, the title information storage frame 374, the partitioning line 378, the title information storage frame 380, and the text information storage frame 382 overlap one another.

The partitioning line 378 extends horizontally, almost fully across the layout area 360, and is positioned at the middle height of the layout area 360. The partitioning line 378 overlaps the text information storage frame 376.

The title information storage frame 380 has a rectangular outline with a width horizontally, almost fully extending across the layout area 360, and a height about one-fifth the height of the layout area 360. The title information storage frame 380 is positioned below the partitioning line 378. The title information storage frame 380 overlaps the text information storage frame 376 and the text information storage frame 382.

The text information storage frame 382 has a rectangular outline with a width horizontally, almost fully across the layout area 360, and a height about half the height of the layout area 360. The text information storage frame 382 is positioned with the bottom left corner thereof aligned with the bottom left corner of the text information storage frame 376, and overlaps the text information storage frame 376 and the title information storage frame 380.

The layout areas 360 on respective pages may or may not be identical in data structure. The data structure is determined by a design by a designer. The data structure refers to a logical structure, and an actual data structure is defined by coordinates data, etc.

When a digital content is laid out, a flow management table 400 for managing the flow object is generated and stored in the user information registration data base DB 40 as shown in FIG. 8. FIG. 8 shows an exemplary data structure of the flow management table 400.

Referring to FIG. 8, the flow management table 400 stores a single record for each object overflowed from the information storage frame. Each record includes a field 402 which registers a document number identifying the document of a digital content, a field 404 which registers a front position (an overflow position) of a portion of an object that is overflowed from the information storage frame, a field 406 which registers a page number (a page number of an overflow source) of an information storage frame from which the object has been overflowed last, a field 408 which registers a page number (of the page storing the flow object) of the information storage frame that has stored the end of the object, and a field 410 which registers a finish flag indicating whether or not the object has been processed.

In the flow management table 400, a flow object is processed on an FIFO (First In First Out) basis. A flow object is overflowed for the first time, a record thereof is registered at the end of the flow management table 400, and an unprocessed flow object is processed starting with the top of the flow management table 400. However, when a flow object is not sufficiently stored in a new information storage frame and overflowed again as a result of processing of an unprocessed flow object, the record as to the flow object is exceptionally registered at the top of the flow management table 400. By registering the record at the top of the flow management table 400 to process it with priority, the content of the document is prevented from being dispersed straddling across a number of pages.

The data structure of the content registration data base DB 42 will now be discussed in detail with reference to FIG. 9.

Figure 9:
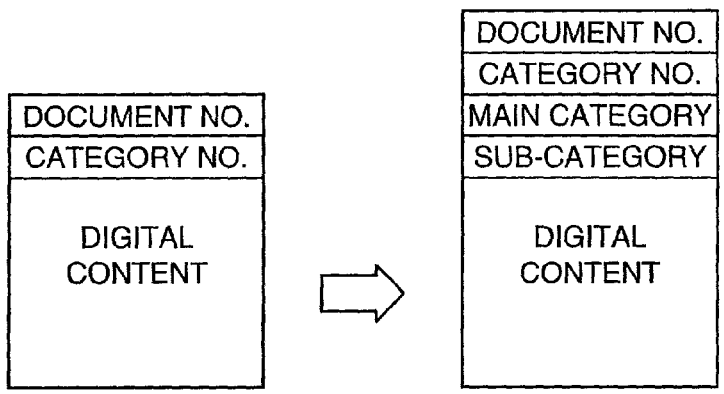
FIG. 9 illustrates a digital content and the data structure of a category number definition table 340.
Figure 9:
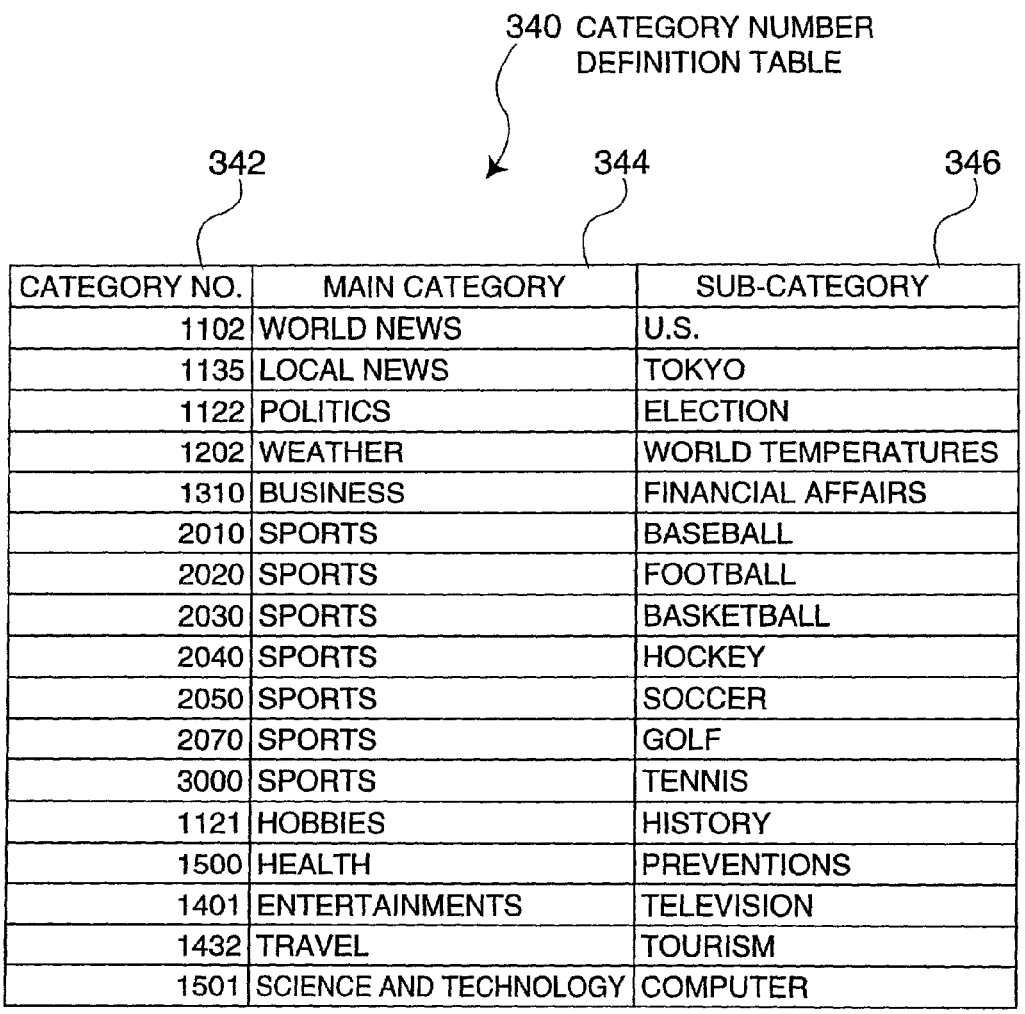

Referring to FIG. 9, the content registration DB 42 stores a category number definition table 340 that shows the relationship between the digital contents supplied from the content providing terminals $S_1$-$S_n$, the main category, the sub-category, and the category number. FIG. 9 shows the digital contents and the data structure of the category number definition table 340.

As shown in FIG. 9(a), the digital contents supplied by the content providing terminals $S_1$-$S_n$ are tagged with the respective document numbers and category numbers, and the content delivery terminal 100 classifies the digital contents by category based on the category numbers, and registers the classified digital contents in the content registration DB 42. When registering, the content delivery terminal 100 references the category number definition table 340, and adds, besides a document number and a category number, the main category, and the sub-category to the digital contents for registration. The digital content is formed as a single document, including title information indicating the title of the document, image information relating to an image of the document, and text information relating to a text of the document.

Referring to FIG. 9(b), the category number definition table 340 registers a single record for each set of the main category and the sub-category. Each record includes a field 342 for registering a category number, a field 344 for registering a main category, and a field 346 for registering a sub-category. As shown in FIG. 9(b), a first row record registers "1102" as the category number, "WORLD NEWS" as the main category, and "U.S." as the sub-category, and a sixth row record registers "2010" as the category number, "SPORTS" as the main category, and "BASEBALL" as the sub-category.

The construction of the CPU 30 and the process executed by the CPU 30 will be discussed referring to FIG. 10 and FIG. 11.

Figure 10:
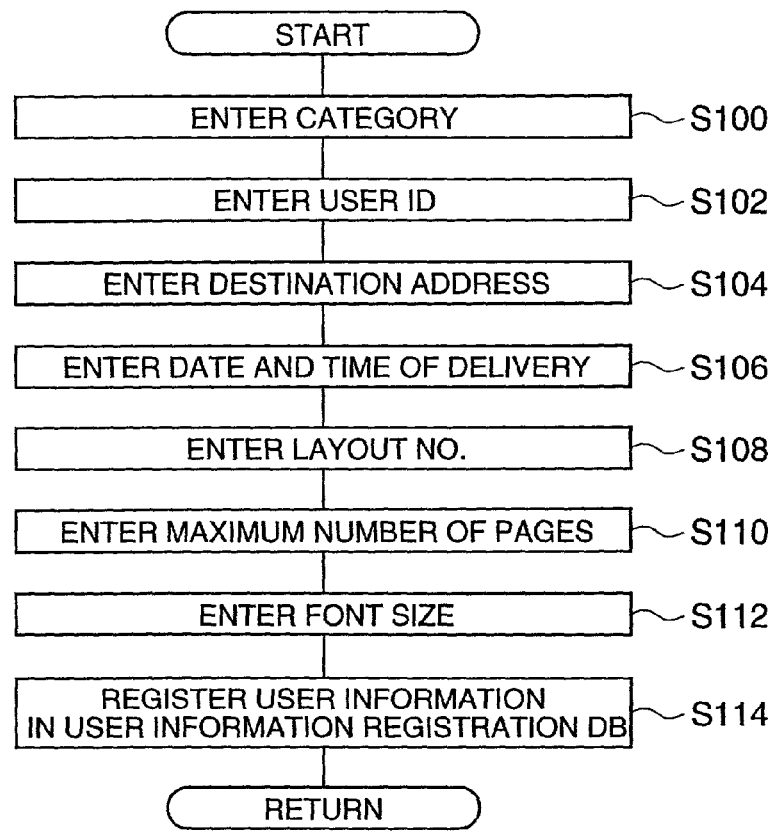
FIG. 10 is a flow diagram illustrating a user registration process.
Figure 11:
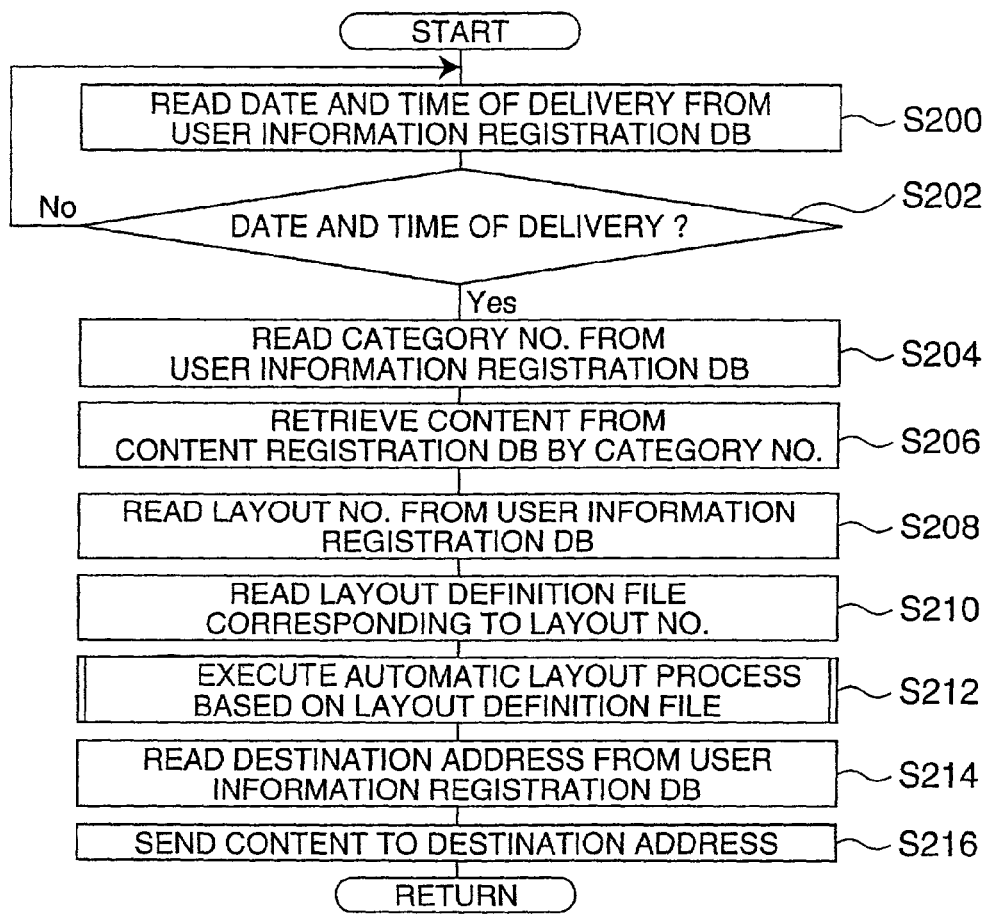
FIG. 11 is a flow diagram illustrating a content delivery process.

The CPU 30, composed of a micro processor unit MPU, starts a predetermined program stored in a predetermined area of the ROM 32, and executes a user registration process and a content delivery process in a time sharing manner in flow diagrams shown in FIG. 10 and FIG. 11.

Referring to FIG. 10, the user registration process will first be discussed in detail. FIG. 10 is a flow diagram showing the user registration process.

When the user has accessed the system, the user registration process requests the user to input the required user information, such as the user ID, and registers the input user information in the user profile table 300. When the CPU 30 starts, the process goes to step S100 shown in FIG. 10. An input operation in each of the following steps is performed through interactive communication with the user.

In step S100, the main category and the sub-category are input. In step S102, the user ID and the password are entered. In step S104, the destination address is input, and in step S106, the date and time of delivery are input, and the process proceeds to step S108.

In step S108, the layout number is input. In step S110, the maximum number of pages is input. In step S112, the font size is input. The process proceeds to step S114, where the CPU 30 registers user information input in steps S100-S112 in the user profile table 300. The CPU 30 ends the above series of process steps, and then returns to the original process.

The content delivery process will now be discussed, referring to FIG. 11. FIG. 11 is a flow diagram showing the content delivery process.

The content delivery process delivers the digital content to the user terminal 200 by referencing the user profile table 300. Referring to FIG. 11, when the CPU 30 starts, the process proceeds to step S200. The process of the following steps is performed for each record of the user profile table 300. In practice, each step can be performed by the number of times equal to the number of records registered in the user profile table 300.

In step S200, the date and time of delivery are read from the user profile table 300. In step S202, the CPU 30 determines, from the read date and time of delivery, whether it is the day and time on which the digital content must be delivered. When the CPU 30 determines that it is the day and time on which the digital content must be delivered (i.e., Yes), the process proceeds to step S204, or else (i.e., No) the process returns to step S200.

In step S204, the CPU 30 reads the category number from the user profile table 300. In step S206, the CPU 30 searches for the digital content in the content registration DB 42 in accordance with the read category number, and retrieves the digital content having a category number matching the read category number. The process proceeds to step S208.

In step S208, the CPU 30 reads the layout number from the user profile table 300. In step S210, the CPU 30 references a layout number definition table 330, and reads the layout definition file corresponding to the read layout number from the user information registration DB 40. In step S212, the CPU 30 performs an automatic layout process in which the output layout of the digital content retrieved in step S206 is determined based on the read layout definition file, and thereby the digital content is produced. The process then proceeds to step S214.

In step S214, the CPU 30 reads the destination address from the user profile table 300. In step S216, the CPU 30 delivers the produced digital content to the read destination address. The CPU 30 ends the above series of process steps and returns to the original process.

Figure 12:
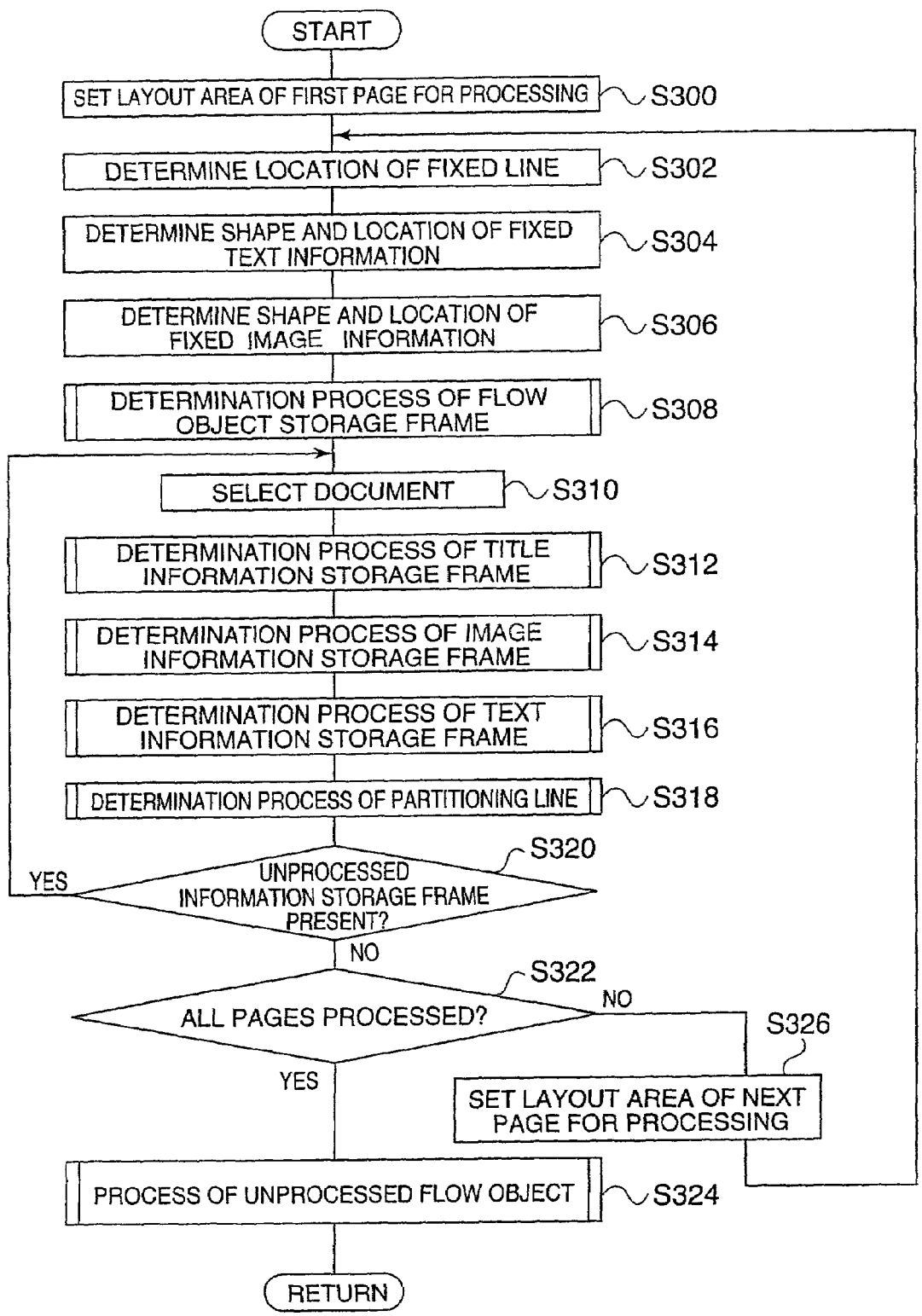
FIG. 12 is a flow diagram illustrating an automatic layout process.

The automatic layout process in step S212 is discussed in detail below with reference to FIG. 12. FIG. 12 is a flow diagram showing the automatic layout process.

When the automatic layout process is initiated in step S212, the process shifts to step S300 as shown in FIG. 12.

In step S300, the CPU 30 sets the layout area 360 on the first page in the layout definition file read in step S210 as an object to be processed. In step S302, the location of a fixed line arranged to be stationary within the page is determined. In step S304, the shape and the location of fixed text information arranged to be stationary within the page are determined. In step S306, the shape and location of fixed image information arranged to be stationary within the page are determined. The process proceeds to step S308.

In step S308, the process of determining the shape and location of a flow object storage frame is performed. In step S310, a document to be arranged in the layout area 360 is selected based on the predetermined priority order from digital contents retrieved in step S206. The process proceeds to step S312.

In step S312, a process of determining the shape and location of a title information storage frame is performed based on the document selected in step S310. In step S314, a process of determining the shape and location of an image information storage frame is performed based on the selected document. In step S316, a process of determining the shape and location of a text information storage frame is performed based on the selected document. In step S318, a process of determining the location of the partitioning line is performed. The automatic layout process then proceeds to step S320.

In step S320, the CPU 30 determines whether an unprocessed information storage frame is present within the layout area 360. When it is determined that no unprocessed information storage frame is present (i.e., No), the process proceeds to step S322. The CPU 30 determines whether process steps S302-S320 have been completed for all pages in the layout definition file read in step S210. When it is determined that all pages have been processed (i.e., Yes), the process proceeds to step S324. A process of posting an unprocessed flow object is performed. The CPU 30 ends the automatic layout process and then returns to the original process.

When it is determined in step S322 that process steps S302-S320 have not been completed for all pages in the layout definition file read in step S210 (i.e., No), the process proceeds to step S326. The layout area 360 on a next page in the layout definition file read in step S210 is set as an object to be processed, and the process returns to step S302.

When it is determined in step S320 that an unprocessed information storage frame is present in the layout area 360 (i.e., Yes), the process returns to step S310.

Figure 13:
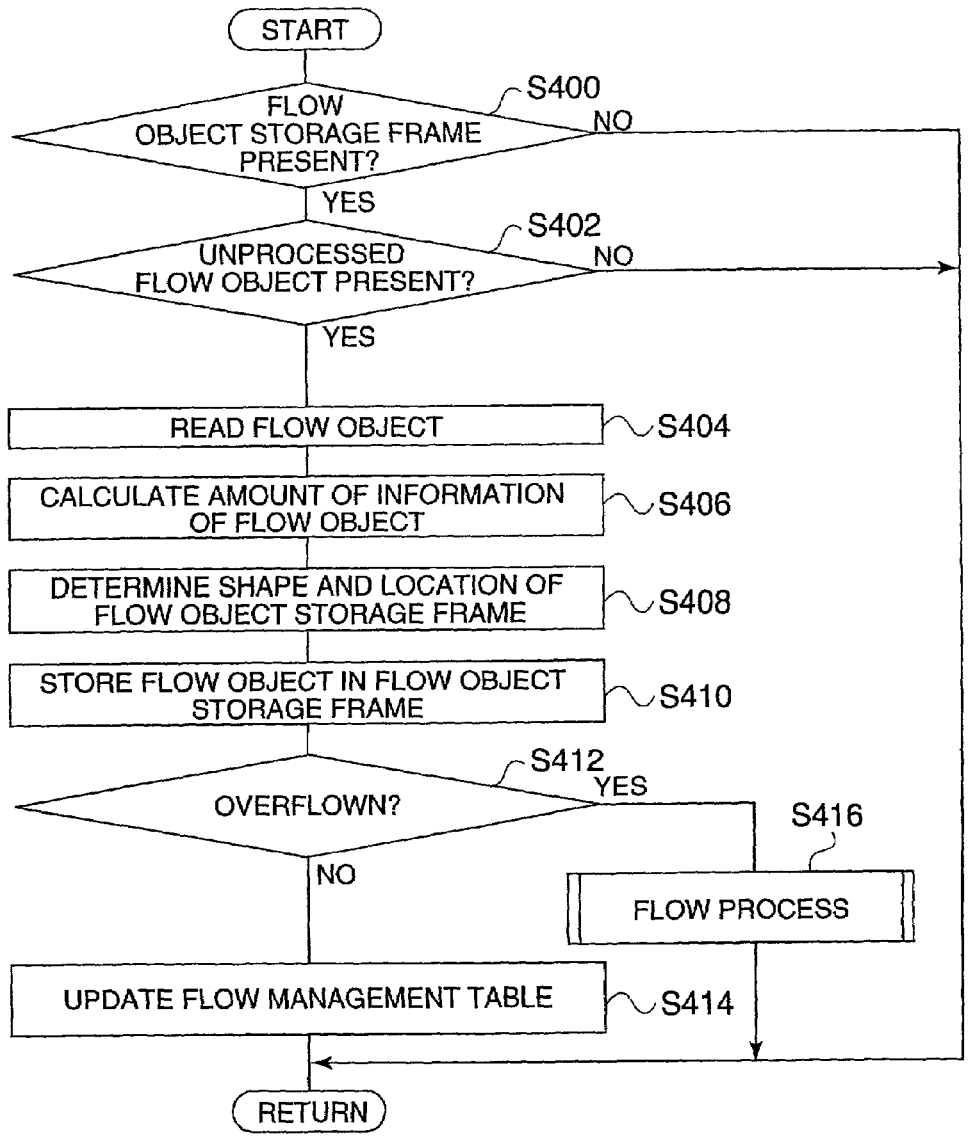
FIG. 13 is a flow diagram illustrating the determination process of a flow object storage frame.

The determination process of the flow object storage frame in step S308 is discussed below in detail with reference to FIG. 13. FIG. 13 is a flow diagram showing an exemplary determination process of the flow object storage frame.

Upon being initiated, the determination process of the flow object storage frame in step S308 shifts to step S400 as shown in FIG. 13.

The CPU 30 determines in step S400 whether a flow object storage frame is present within the layout area 360. When it is determined that a flow object storage frame is present (i.e., Yes), the process proceeds to step S402, or else (i.e., No) the CPU 30 ends the above series of process steps and returns to the original process.

In step S402, the CPU 30 searches the flow management table 400 from the top thereof to determine whether a record with the finish flag cleared is present. When it is determined that a record with the finish flag cleared is present (i.e., Yes), the process proceeds to step S404. The CPU 30 reads the flow object, referencing the record with the finish flag cleared, and then proceeds to step S406. The CPU 30 calculates the amount of information of the read flow object, and then proceeds to step S408.

In step S408, the CPU 30 determines the shape and location of the flow object storage frame based on the calculated amount of information. In step S410, the CPU 30 stores the read flow object in the flow object storage frame, and then proceeds to step S412. Specifically, in step S408, the shape and location of the flow object storage frame are determined so that the flow object storage frame may not overlap another information storage frame, the shape of which has already been determined.

For example, if the flow object storage frame overlaps another information storage frame, the shape of which has already been determined, the flow object storage frame is changed in shape and moved in a movable direction so as not to overlap another information storage frame takes place. To retain the layout intended by a designer as mush as possible, change in shape and movement of the flow object storage frame are preferably limited to a minimum. The direction in which the flow object storage frame is changed in shape or moved may be dynamically determined or may be determined beforehand. The same is true of process steps S506, S606, and S706.

It is determined in step S412 that the read flow object is fully stored in the flow object storage frame. When it is determined that the flow object is fully stored in the flow object storage frame (not overflowed) (i.e., No), the process proceeds to step S414. The store page number of the flow object is set to the current page number in the corresponding record, and the finish flag is set. The CPU 30 ends the above series of process steps and then returns to the original process.

When it is determined in step S412 that the read flow object cannot be fully stored in the flow object storage frame (overflowed) (i.e., Yes), the process proceeds to step S416. An overflow process is performed on a portion of the flow object that cannot be stored in the flow object storage frame. The CPU 30 ends the above series of process steps and then returns to the original process.

When it is determined in step S402 that any record with the finish flag thereof cleared is not present (i.e., No), the CPU 30 ends the series of process steps and then returns to the original process.

Figure 14:
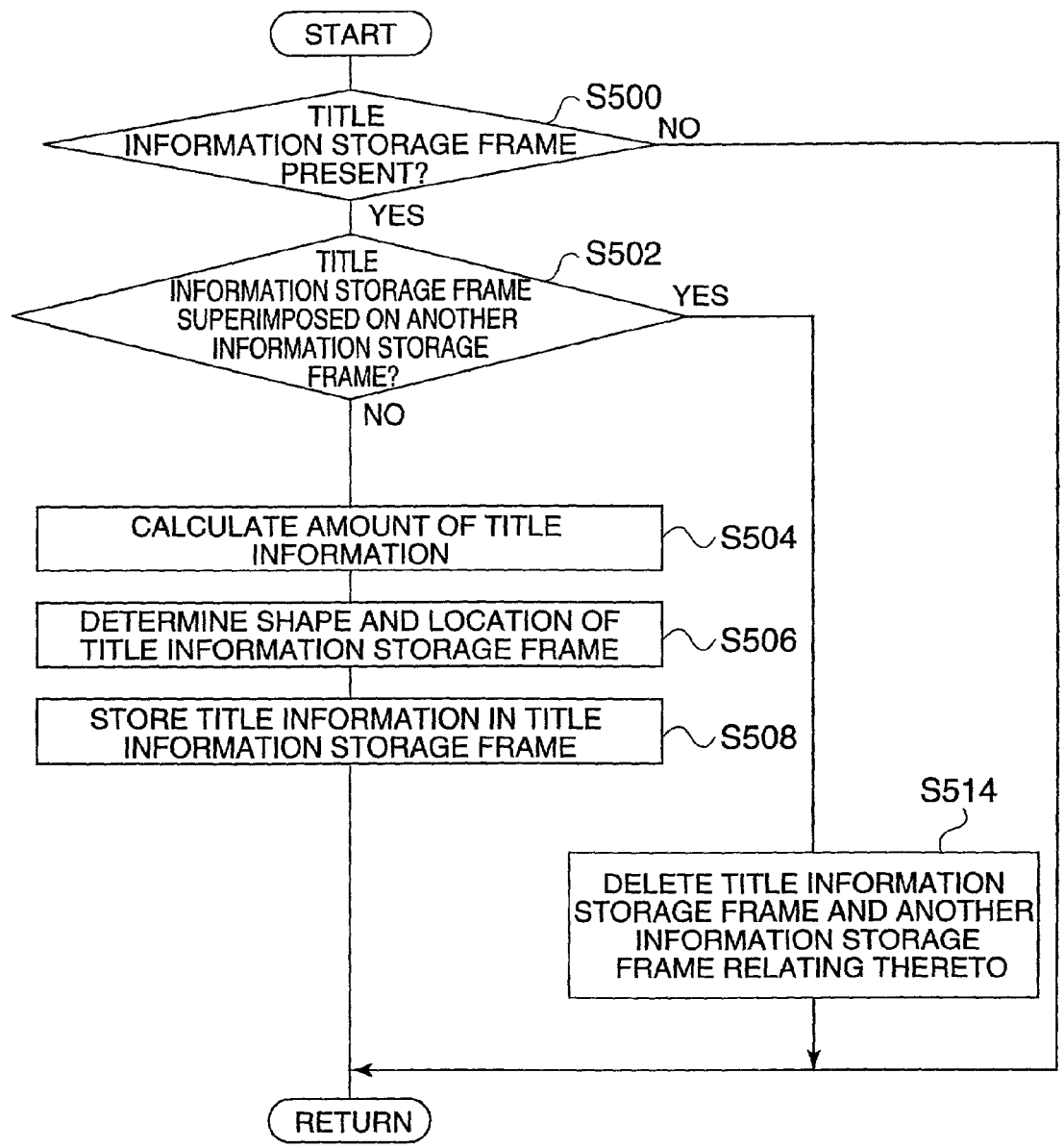
FIG. 14 is a flow diagram illustrating the determination process of a title information storage frame.

Referring to FIG. 14, the determination process of the title information storage frame in step S312 is discussed in detail below. FIG. 14 is a flow diagram of the determination process of the title information storage frame.

Upon being initiated, the determination process of the title information storage frame in step S312 shifts to step S500 as shown in FIG. 14.

In step S500, the CPU 30 determines whether a title information storage frame is present in the layout area 360. When it is determined that a title information storage frame is present (i.e., Yes), the process proceeds to step S502, or else (i.e., No), the CPU 30 ends the above series of process steps and returns to the original process.

It is determined in step S502 whether the title information storage frame overlaps another information storage frame, the shape and location of which have been determined. When it is determined that the title information storage frame does not overlap another information storage frame, the shape and location of which have been determined (i.e., No), the process proceeds to step S504. The CPU 30 calculates the amount of title information contained in the selected document, and then proceeds to step S506.

In step S506, the shape and location of the title information storage frame are determined based on the calculated amount of information. In step S508, the title information contained in the selected document is stored in the title information storage frame. The CPU 30 ends the above series of process steps, and returns to the original process.

When it is determined in step S502 that the title information storage frame overlaps another information storage frame, the shape and location of which have been determined (i.e., Yes), the process proceeds to step S514. The CPU 30 deletes the title information storage frame and another information storage frame relating thereto (an image information storage frame or a text information storage frame, expected to store the document having the same content). The CPU 30 ends the above series of process steps, and returns to the original process.

Figure 15:
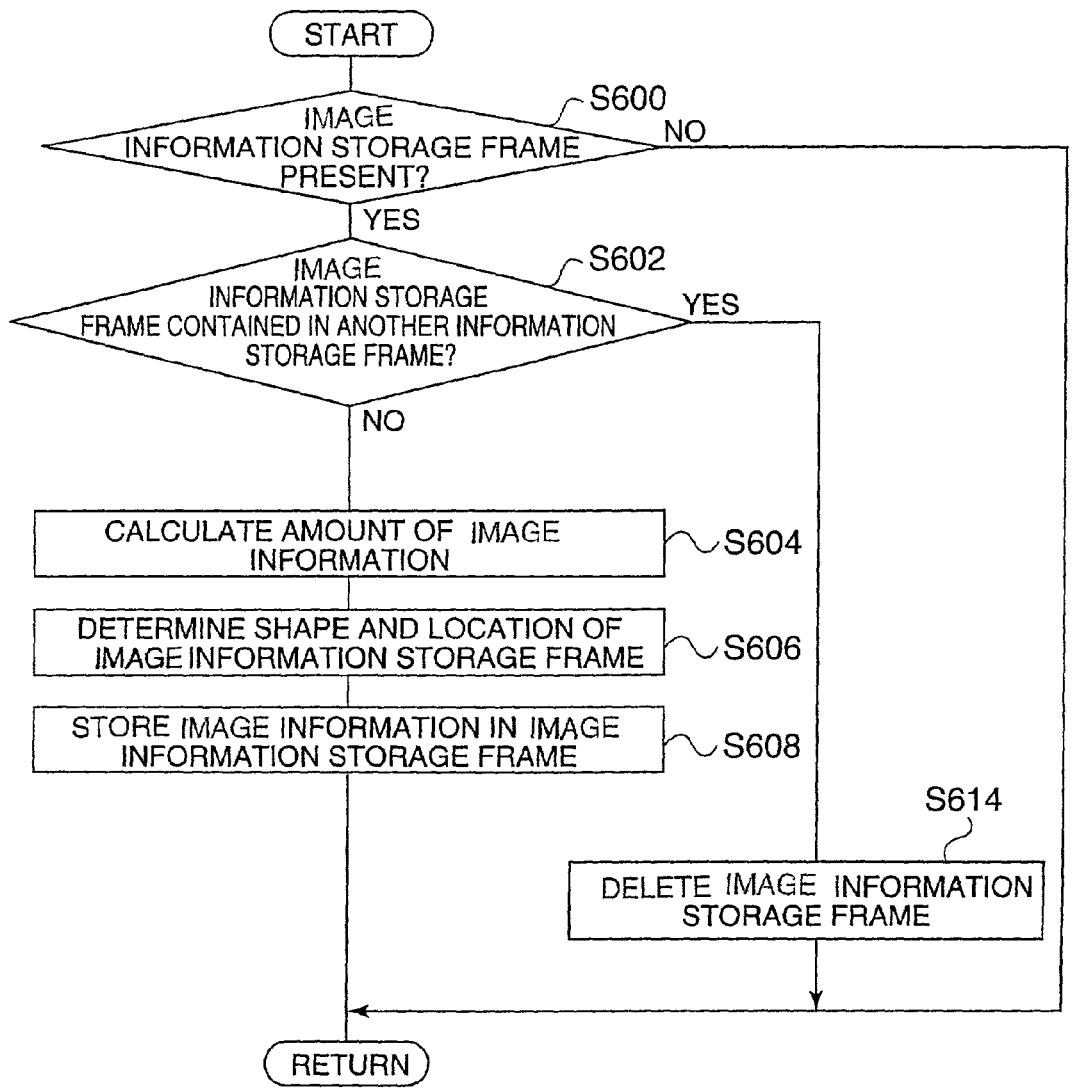
FIG. 15 is a flow diagram illustrating the determination process of a image information storage frame.

The determination process of the image information storage frame in step S314 is discussed below in detail with reference to FIG. 15. FIG. 15 is a flow diagram of the determination process of the image information storage frame.

Upon being initiated, the determination process of the image information storage frame in step S314 shifts to step S600 as shown in FIG. 15.

In step S600, the CPU 30 determines whether an image information storage frame is present in the layout area 360. When it is determined that an image information storage frame is present (i.e., Yes), the process proceeds to step S602, or else (i.e., No), the CPU 30 ends the above series of process steps, and returns to the original process.

In step S602, the CPU 30 determines whether the image information storage frame is included in another information storage frame. When it is determined that the image information storage frame is not contained in another information storage frame (i.e., No), the process proceeds to step S604. The CPU 30 calculates the amount of image information contained in the selected document, and then proceeds to step S606.

In step S606, the CPU 30 determines the shape and location of the image information storage frame based on the calculated amount of information. In step S608, the CPU 30 stores the image information contained in the selected document into the image information storage frame. The CPU 30 then ends the above series of process steps, and then returns to the original process.

When it is determined in step S602 that the image information storage frame is contained in another information storage frame (i.e., Yes), the process proceeds to step S614. The CPU 30 deletes the image information storage frame and then ends the above series of process steps to return to the original process.

Figure 16:
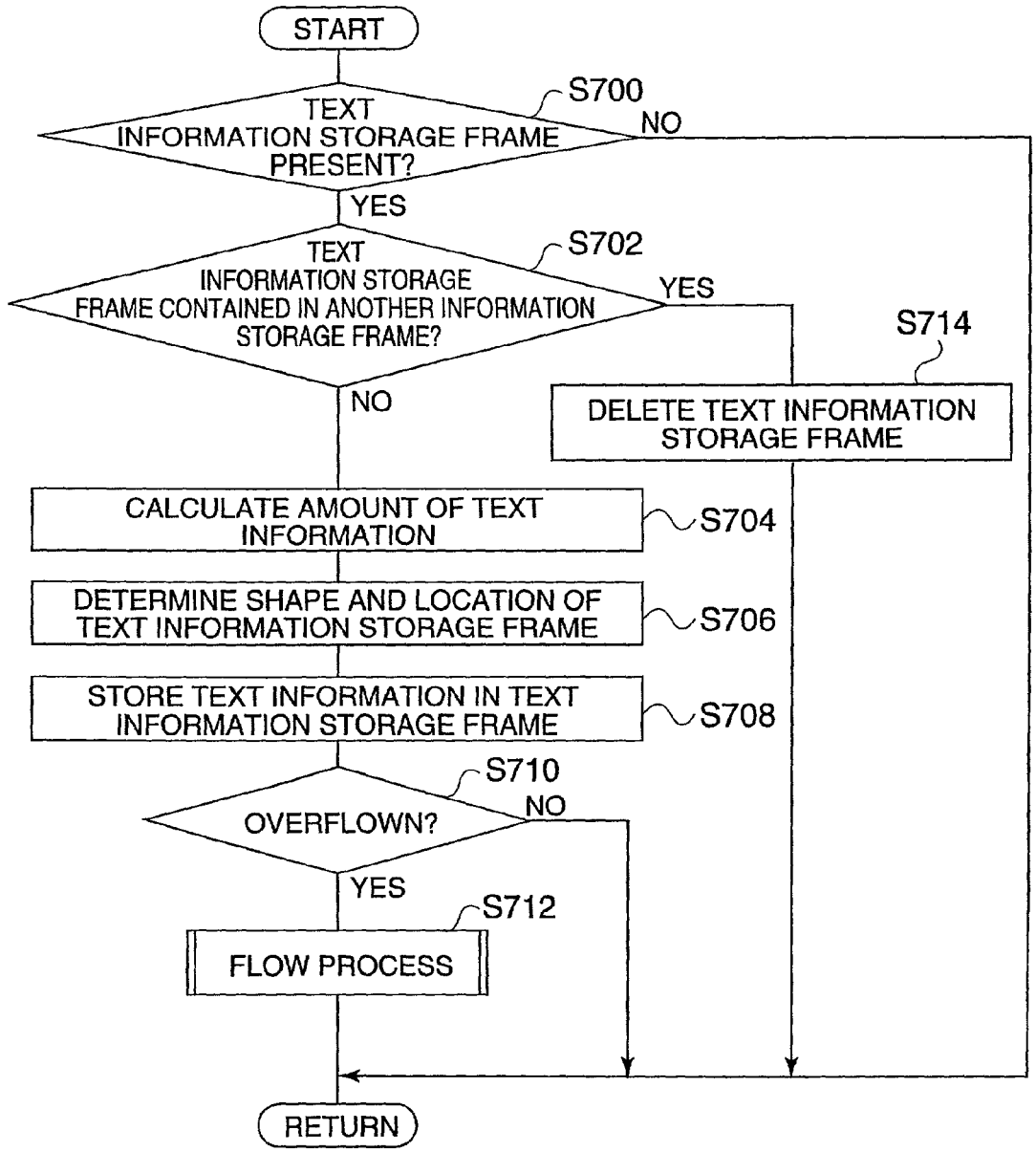
FIG. 16 is a flow diagram illustrating the determination process of a text information storage frame.

The determination process of the text information storage frame in step S316 is discussed below in detail with reference to FIG. 16. FIG. 16 is a flow diagram showing the determination process of the text information storage frame.

Upon being initiated, the determination process of the text information storage frame in step S316 shifts to step S700 as shown in FIG. 16.

In step S700, the CPU 30 determines whether any text information storage frame is present in the layout area 360. When it is determined that a text information storage frame is present within the layout area 360 (i.e., Yes), the process proceeds to step S702, or else (i.e., No), the CPU 30 ends the above series of process steps, and then returns to the original process.

In step S702, the CPU 30 determines whether the text information storage frame is contained in another information storage frame. When it is determined that the text information storage frame is not contained in another information storage frame (i.e., No), the process proceeds to step S704. The CPU 30 calculates the amount of text information contained in the selected document, and proceeds to step S706.

In step S706, the CPU 30 determines the shape and location of the text information storage frame based on the calculated amount of information, and proceeds to step S708. The CPU 30 stores the text information contained in the selected document into the text information storage frame, and proceeds to step S710.

In step S710, the CPU 30 determines whether the text information contained in the selected document is fully stored in the text information storage frame. When it is determined that the text information is fully stored in the text information storage frame (not overflowed) (i.e., No), the CPU 30 ends the above series of process steps and then returns to the original process.

When it is determined in step S710 that the text information contained in the selected document is not fully stored in the text information storage frame (overflowed) (i.e., Yes), the CPU 30 proceeds to step S712. The CPU 30 performs a overflow process on a portion of the text information that is not stored in the text information storage frame, ends the above series of process steps, and then returns to the original process.

When it is determined in step S702 that the text information storage frame is contained in another information storage frame (i.e., Yes), the process proceeds to step S714. The CPU 30 deletes the text information storage frame, ends the above series of process steps, and then returns to the original process.

Figure 17:
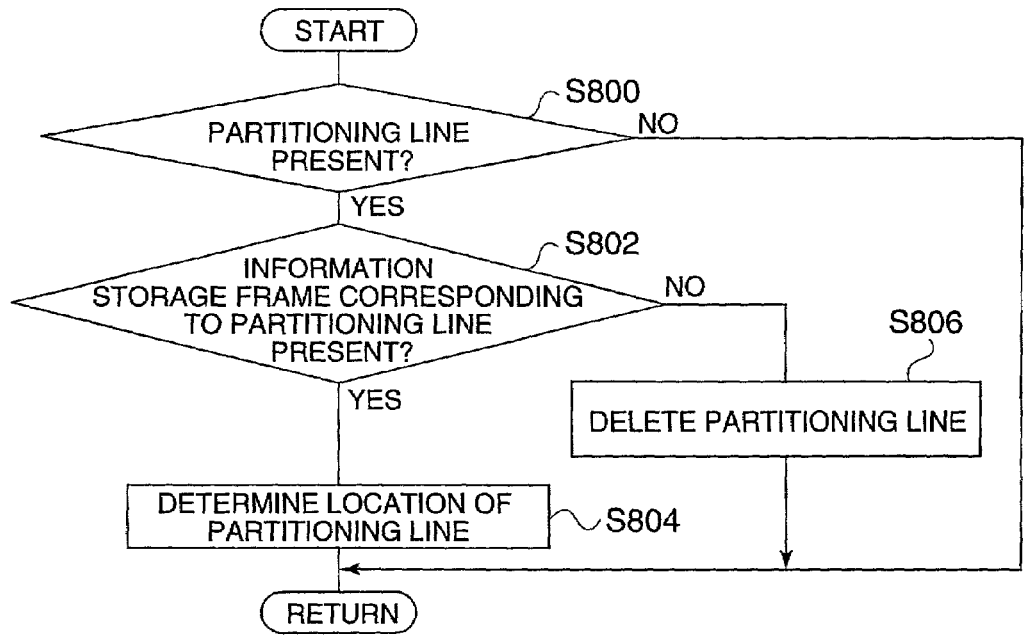
FIG. 17 is a flow diagram illustrating the determination process of a partitioning line.

The determination process of the partitioning line in step S318 is discussed below in detail with reference to FIG. 17. FIG. 17 is a flow diagram showing the determination process of the partitioning line.

Upon being initiated, the determination process of the partitioning line in step S318 shifts to step S800 as shown in FIG. 17.

In step S800, the CPU 30 determines whether a partitioning line is present within the layout area 360. When it is determined that a partitioning line is present within the layout area 360 (i.e., Yes), the process proceeds to step S802, or else (i.e., No), the CPU 30 ends the above series of process steps, and then returns to the original process.

In step S802, the CPU 30 determines whether an information storage frame to be partitioned by a partitioning line is present within the layout area 360. When it is determined that an information storage frame to be partitioned by a partitioning line is present within the layout area 360 (i.e., Yes), the process proceeds to step S804. The CPU 30 sets a partitioning line at a partitioning location of the information storage frame to be partitioned by the partitioning line, ends the above series of process steps, and then returns to the original process.

When it is determined in step S802 that any information storage frame to be partitioned by a partitioning line is not present within the layout area 360 (i.e., No), the process proceeds to step S806. The CPU 30 deletes the partitioning line, ends the above series of process steps, and then returns to the original process.

Figure 18:
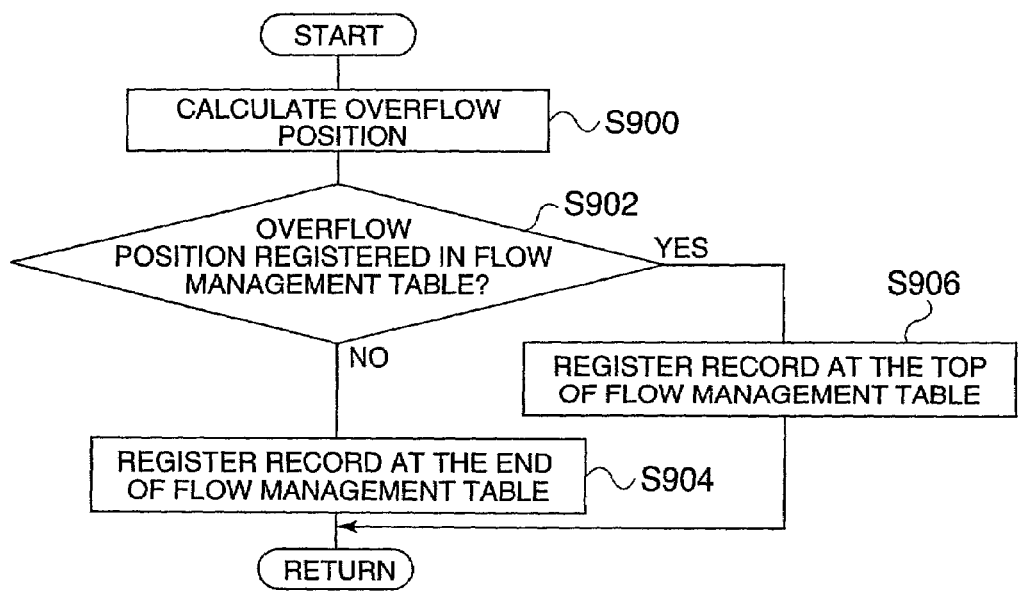
FIG. 18 is a flow diagram illustrating a flow process.

The process steps in S416, and S712 are discussed in detail below with reference to FIG. 18. FIG. 18 is a flow diagram showing the flow process of each step.

Upon being initiated, the flow process in each of steps S416, and S712 starts with step S900.

In step S900, the CPU 30 calculates the front position of a portion of an object that is not fully stored in the information storage frame. In step S902, the CPU 30 determines whether a flow object having the same document number has been registered in the flow management table 400. When it is determined that no flow object having the same document number has been registered (i.e., No), the process proceeds to step S904. The CPU 30 generates a record of the flow object, registers the generated record at the end of the flow management table 400, and ends the above series of process steps, and then returns to the original process. Specifically, in step S904, the overflow position is set to the front position calculated in step S900, the document number is set to be the flow object, the page number of the overflow source is set to be a current page number, and a finish flag is cleared. The record of the flow object is thus generated. The same is true of the process step in S906.

When it is determined in step S902 that a flow object having the same document number has been registered in the flow management table 400 (i.e., Yes), the process proceeds to step S906. A record of the flow object is generated, and the already registered record is deleted, and the generated record is registered at the top of the flow management table 400. The CPU 30 ends the above series of process steps, and then returns to the original process.

Figure 19:
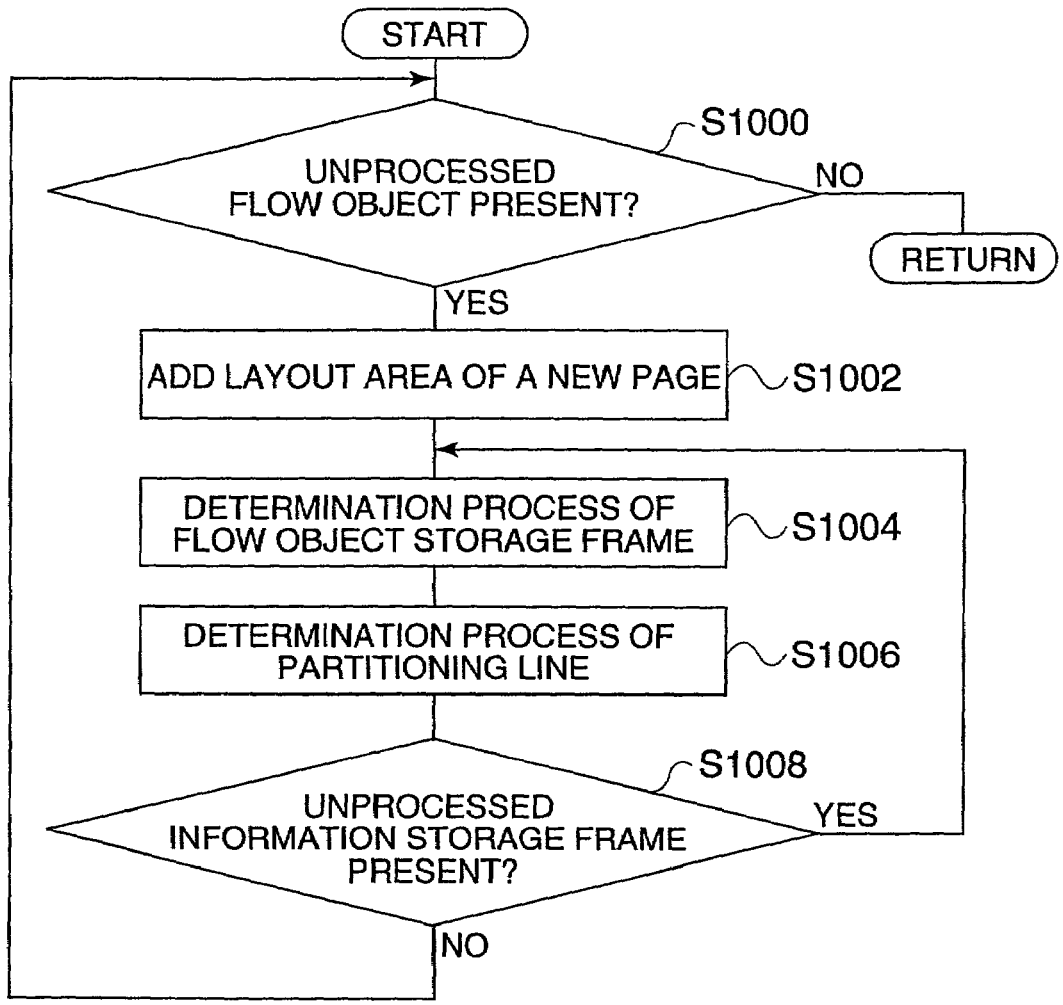
FIG. 19 is a flow diagram illustrating the process of an unprocessed flow object.

The process of the unprocessed flow object in step S324 is discussed below in detail with reference to FIG. 19. FIG. 19 is a flow diagram showing the process of the unprocessed flow object.

Upon being initiated, the process of the unprocessed flow object in step S324 proceeds to step S1000 as shown in FIG. 19.

In step S1000, the CPU 30 starts with the top of the flow management table 400, searching for a record with a finish flag cleared. When it is determined that a record with a finish flag thereof cleared is present (i.e., Yes), the process proceeds to step S1002, or else (i.e., No), the CPU 30 ends the above series of process steps and then returns to the original process.

In step S1002, the CPU 30 adds a layout area 360 of a new page, and proceeds to step S1004. Like in step S308, the CPU 30 determines the shape and location of the flow object storage frame, and then proceeds to step S1006. Like in step S318, the CPU 30 determines the location of the partitioning line, and then proceeds to step S1008.

Instep S1008, the CPU 30 determines whether an unprocessed information storage frame is present within the layout area 360. When it is determined that any unprocessed information storage frame is present (i.e., Yes), the process returns to step S1004, or else (i.e., No), the process returns to step S1000.

The operation of the above embodiment will now be discussed.

The process of registering information required to deliver the digital content is discussed below. When the user desires delivery of a digital content, the user accesses a content delivery terminal 100 at a user terminal 200 using a WWW browser, and then requests a user registration.

When the user terminal 200 receives the user registration request, the user terminal 200 requests the user to input required user information in communication with the content delivery terminal 100. In response to the request, the user inputs, as the user information, a main category, a sub-category, a user ID, a password, a destination address, the date of delivery, the time of delivery, a layout number, the maximum number of pages, and a font size. The user information is then sent to the content delivery terminal 100.

Upon receiving the user information in response to the registration request, the content delivery terminal 100 registers the received user information in the user profile table 300 after process steps S100-S114.

The process of delivering a digital content is discussed below referring to the user profile table 300.

When it is the day and time for the content delivery terminal 100 to deliver the digital content, by referencing the user profile table 300, the CPU 30 performs process steps in S204 and S206. The CPU 30 therefore reads the category number from the user profile table 300 and searches for digital contents of the content registration data base DB 42, based on the read category number, thereby retrieving a digital content having a category number identical to the read category number. Through process steps S208-S212, the CPU 30 reads a layout number from the user profile table 300, and references a layout number definition table 330, thereby reading a layout definition file corresponding to the read layout number from the user information registration data base DB 40. The CPU 30 determines an output layout for the retrieved digital content based on the read layout definition file, and produces a digital content.

Figure 20:
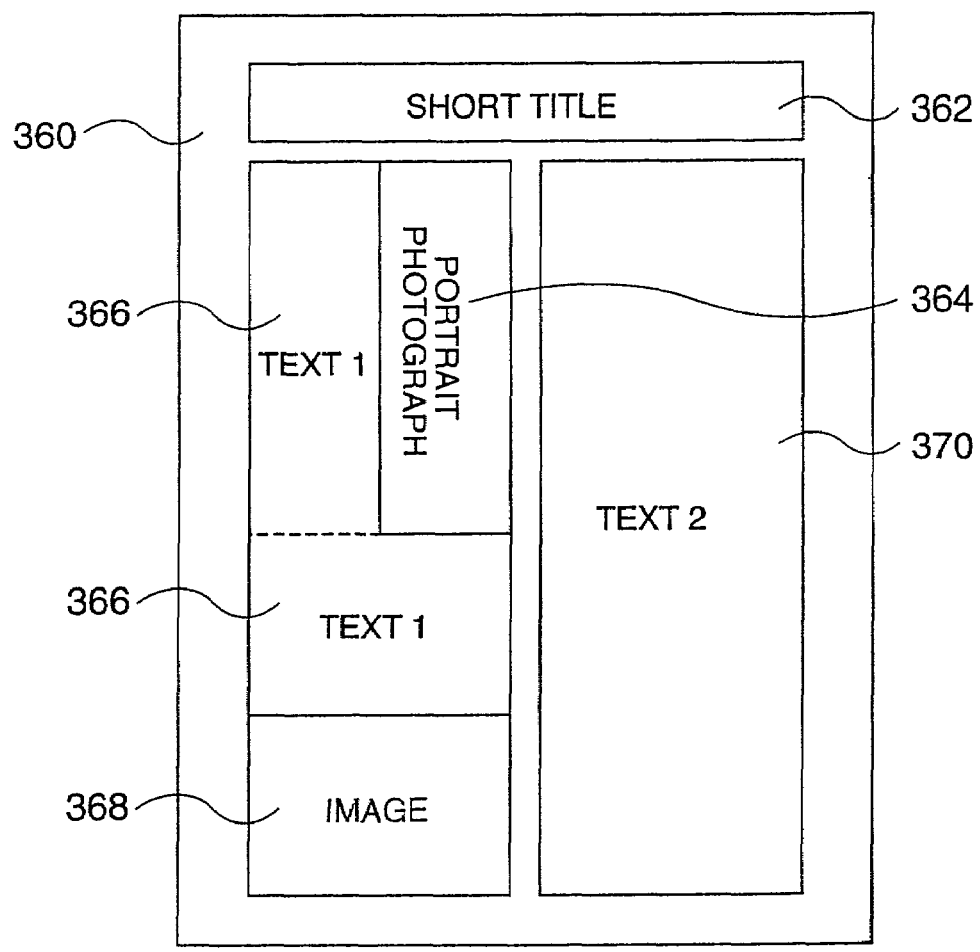
FIG. 20 illustrates a layout process based on a basic layout shown in FIG. 6.

Referring to FIG. 20, the layout process using a basic layout shown in FIG. 6 is discussed with reference to FIG. 20. FIG. 20 exemplifies the layout process based on the basic layout shown in FIG. 6.

In the layout process, the CPU 30 determines the location of a fixed line, the shape and location of fixed text information, and the shape and location of fixed image information through steps S300-S310 in that order. The CPU 30 selects a document to be arranged in the layout area 360 from the digital contents retrieved in step S206 in accordance with a predetermined priority order.

The title information may be contained in the selected document. Since the title information storage frame 362 is present in the layout area 360, the CPU 30 performs step S312, thereby determining the shape and location of the title information storage frame 362 based on the selected document. In the determination process of the title information storage frame through steps S500-S508, the CPU 30 calculates the amount of title information contained in the selected document, determines the shape and location of the title information storage frame 362 based on the calculated amount of information, and stores the title information contained in the selected document into the title information storage frame 362. When the title is short as shown in FIG. 20, a default title information storage frame 362 is changed in shape in a vertical direction so that the title information just fits into the title information storage frame 362.

The image information may be contained in the selected document. Since the image information storage frame 364 is present in the layout area 360, the CPU 30 determines the shape and location of the image information storage frame 364 based on the selected document in step S314. In the determination process of the image information storage frame through steps S600-S608, the CPU 30 calculates the amount of image information contained in the selected document, determines the shape and location of the image information storage frame 364 based on the calculated amount of information so that the image information storage frame 364 does not overlap another information storage frame, and stores the image information contained in the selected document into the image information storage frame 364. When the image is substantially longer in vertical dimension than in width dimension and is rightward offset as shown in FIG. 20, the default image information storage frame 364 is changed in shape downward (or upward if possible) to the limit within which the image information storage frame 364 still remains clear of the title information storage frame 362. Having the location resulting from the change in shape as the limit of movement in the upward direction, the image information storage frame 364 is changed in shape rightward while the aspect ratio of the image is kept. In this way, the image is posted to the maximum size thereof with the aspect ratio kept.

More image information may be contained in the selected document. Since the image information storage frame 368 is present in the layout area 360, the CPU 30 stores the image information contained in the selected document into the image information storage frame 368 through steps S600-S608 in a way similar to that already discussed above. When the width dimension of the image is larger than the height dimension as shown in FIG. 20, the image information storage frame 368 is moved downward (or upward) with the default width and aspect ratio thereof maintained.

Text information may be contained in the selected document. Since the text information storage frame 366 is present in the layout area 360, the CPU 30 determines the shape and location of the text information storage frame 366 based on the selected document in step S316. In the determination process of the text information storage frame through steps S700-S710, the CPU 30 calculates the amount of text information contained in the selected document so that the text information storage frame 366 does not overlap another information storage frame, determines the shape and location of the text information storage frame 366 based on the calculated amount of information, and stores the text information contained in the selected document into the text information storage frame 366. When the image information storage frame 364 overlaps the top right portion of the text information storage frame 366 as shown in FIG. 20, the text information storage frame 366 is split into two top and bottom parts, one part overlapped by the image information storage frame 364 and the other not overlapped.

The top part of the text information storage frame 366 is changed in shape leftward only up to reaching the state of not overlapping the image information storage frame 364 with the lower edge and the left edge thereof as the downward and leftward moving limits, and is changed in shape downward (or upward if possible) only up to reaching the state of not overlapping the title information storage frame 362. The bottom part of the text information storage frame 366 is changed upward in shape with the upper edge thereof as the upward moving limit only up to reaching the state of not overlapping the image information storage frame 368. The text information contained in the selected document is first stored into the top part of the text information storage frame 366, and a portion of the text information left unstored is stored in the bottom part of the text information storage frame 366. By splitting the text information storage frame 366 that overlaps another information storage frame, the text information is efficiently stored, while continuity of the text content is still assured between the split frames.

More text information may be contained in the selected document. Since the text information storage frame 370 is still present in the layout area 360, the text information contained in the selected document is stored into the text information storage frame 370 through steps S700-S710 in a way similar to that described above. When the number of characters in the text information is large as in FIG. 20, the text information storage frame 370 is handled in the default thereof without being modified.

Since there is no overflow object present in the example shown in FIG. 20, the flow object storage frame 372 is deleted.

Figure 21:
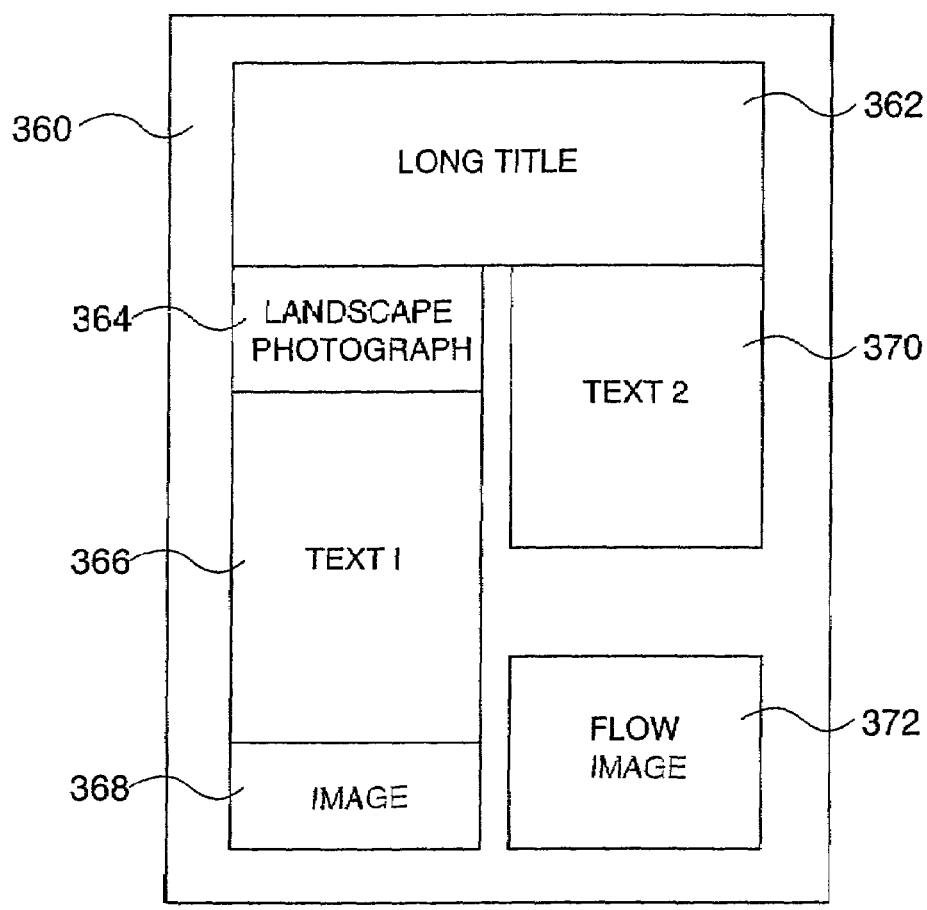
FIG. 21 illustrates another layout process based on the basic layout shown in FIG. 6.

Another layout process using the basic layout shown in FIG. 6. is now discussed in detail with reference to FIG. 21. FIG. 21 shows another layout process performed by using the basic layout shown in FIG. 6.

In the layout process through steps S300-S310, the CPU 30 determines the location of a fixed line, the shape and location of fixed text information, and the shape and location of the fixed image information in this order. The CPU 30 selects a document to be arranged in the layout area 360 from the digital contents retrieved in step S206 with a predetermined priority order.

The flow object storage frame 372 is present in the layout area 360 when a flow object is present, and the CPU 30 determines the shape and location of the flow object storage frame 372 in step S308.

In the determination process of the flow object storage frame through steps S400-S412, the CPU 30 reads the flow object, calculates the amount of information of the read flow object, determines the shape and location of the flow object storage frame 372 based on the calculated amount of information, and stores the read flow object in the flow object storage frame 372. When the flow object is image information with the horizontal width of the image larger than the vertical height thereof as shown in FIG. 21, the flow object storage frame 372 is changed in shape downward (or upward) with the aspect ratio of the image maintained.

When title information is contained in the selected document, there is the title information storage frame 362 in the layout area 360, and the CPU 30 stores the title information contained in the selected document into the title information storage frame 362 through steps S500-S508 in a way similar to that described above. When the title is relatively long as shown in FIG. 21, the title information storage frame 362 is changed downward in shape so that the title information fits into the title information storage frame 362.

When image information is contained in the selected document, there is the image information storage frame 364 in the layout area 360, and the CPU 30 stores the image information contained in the selected document into the image information storage frame 364 through steps S600-S608 in a way similar to that described above. When the width of the image information is larger in dimension than the height thereof as shown in FIG. 21, the default image information storage frame 364 is changed downward in shape only up to reaching the state of not overlapping the title information storage frame 362. Then, with the top edge after the change as the upward moving limit, the image information storage frame 364 is changed upward in shape with the aspect ratio of the image maintained.

When more image information is contained in the selected document, there is the image information storage frame 368 in the layout area 360, and the CPU 30 stores the image information contained in the selected document into the image information storage frame 368 through steps S600-S608 in a way similar to that described above. When the width dimension of the image is larger than the height dimension thereof as shown in FIG. 21, the image information storage frame 368 is downward (or upward) changed in shape with the default width thereof and the aspect ratio of the image maintained.

When text information is contained in the selected document, there is the text information storage frame 366 in the layout area 360, and the CPU 30 stores the text information contained in the selected document into the text information storage frame 366 through steps S700-S710 in a way similar to that described above. In the case shown in FIG. 21, the default text information storage frame 366 is upward and downward changed in shape only up to reaching the state of not overlapping the image information storage frames 364 and 368. With the upper edge of the text information storage frame 366 after the change as the upward moving limit, the text information storage frame 366 is changed upward in shape so that the text information fits into the text information storage frame 366.

When more text information is contained in the selected document, there is the text information storage frame 370 in the layout area 360, and the CPU 30 stores the text information contained in the selected document in the text information storage frame 370 through steps S700-S710 in a way similar to that described above. In the case shown in FIG. 21, the default text information storage frame 370 is upward and downward changed in shape only up to reaching the state of not overlapping the title information storage frame 362 and the flow object storage frame 372. The text information storage frame 370 is upward changed in shape so that the text information fits into the text information storage frame 370.

When a layout process is performed using the basic layout shown in FIG. 6, the layout results shown in FIGS. 20 and 21, if compared with each other, take over the basic layout shown in FIG. 6 to some degree, although the two cases are different from each other in the amount of information to be posted.

Figure 22:
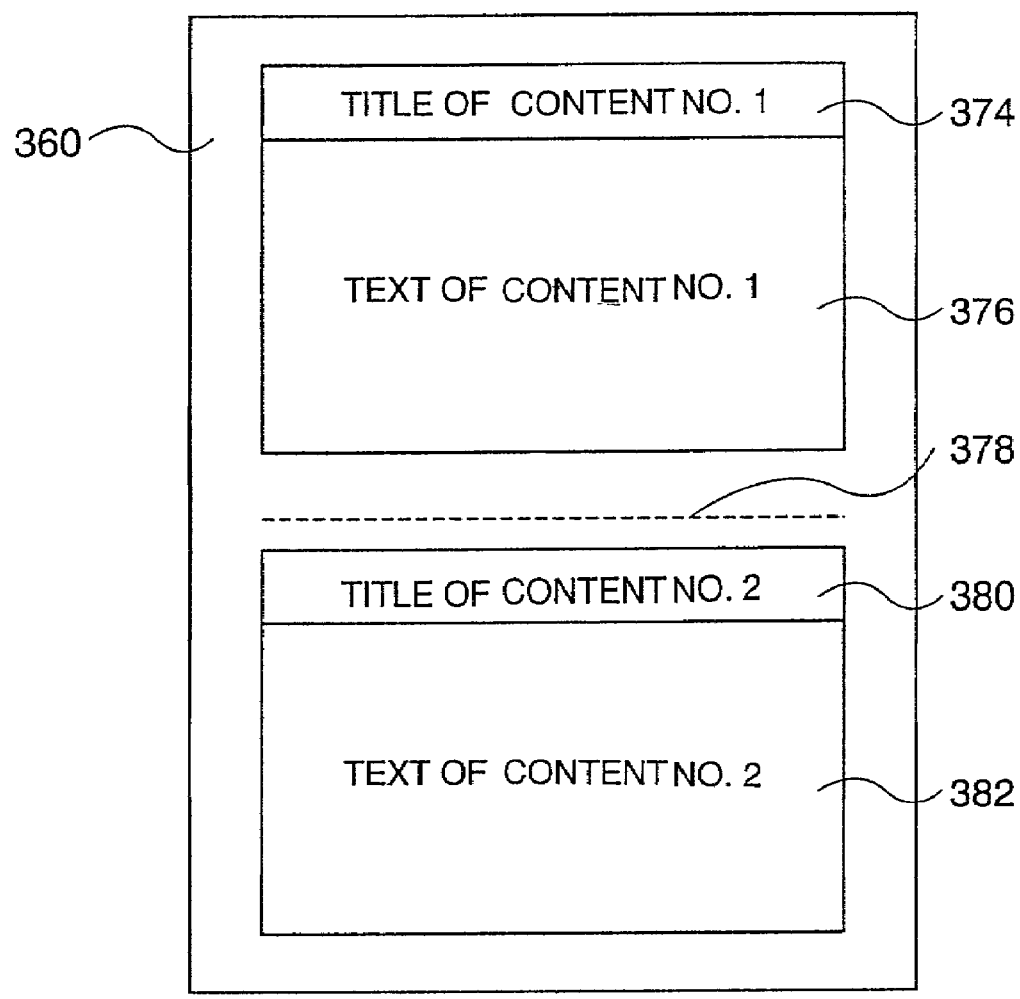
FIG. 22 illustrates a layout process based on the basic layout shown in FIG. 7.

A layout process performed by using the basic layout shown in FIG. 7 is now discussed in detail with reference to FIG. 22. FIG. 22 illustrates the layout process based on the basic layout shown in FIG. 7.

In the layout process through step S300-S310, the CPU 30 determines the location of a fixed line, the shape and location of fixed text information, and the shape and location of fixed image information in that order, and selects a document to be arranged in the layout area 360 from digital contents retrieved in step S206 in accordance with a priority order.

When title information is contained in the selected document, there is the title information storage frame 374 in the layout area 360, and the CPU 30 stores the title information contained in the selected document into the title information storage frame 374 through steps S500-S508 in a way similar to that described above. When the title is relatively short as shown in FIG. 22, the default title information storage frame 374 is upward changed in shape so that the title information just fits into the title information storage frame 374.

When text information is contained in the selected document, there is the text information storage frame 376 is available in the layout area 360, and the CPU 30 stores the text information contained in the document into the text information storage frame 376 through steps S700-S710 in a way similar to that described above. In the case shown in FIG. 22, the default text information storage frame 376 is changed downward (or upward if possible) in shape only up to reaching the state of not overlapping the title information storage frame 374 and then is changed upward in shape so that the text information just fits into the text information storage frame 376.

Since unprocessed information storage frames 380 and 382 are present in the layout area 360, the CPU 30 selects a new document to be arranged in the layout area 360 from digital contents retrieved in step S206 with a predetermined priority order.

When title information is contained in the selected document, there is the title information storage frame 380 in the layout area 360, and the CPU 30 stores the title information contained in the selected document into the title information storage frame 380 through steps S500-S508 in a way similar to that described above. When the title is relatively short as shown in FIG. 22, the default title information storage frame 380 is changed upward in shape so that the title information just fits into the title information storage frame 380.

When text information is contained in the selected document, there is the text information storage frame 382 in the layout area 360, and the CPU 30 stores the text information contained in the selected document into the text information storage frame 382 through steps S700-S710 in a way similar to that described above. In the case shown in FIG. 22, the default text information storage frame 382 is changed downward (or upward if possible) only up to reaching the state of not covering the title information storage frame 380. The text information storage frame 382 is further changed upward in shape so that the text information just fits into the text information storage frame 382.

Since the partitioning line 378 is present in the layout area 360, the CPU 30 determines the location of the partitioning line 378 in step S318. The information storage frames 380 and 382 to be partitioned by partitioning line 378 are present in the layout area 360. In the determination process of the partitioning line 378 through steps S800-S804, the CPU sets the partitioning line 378 between the information storage frames 380 and 382. Referring to FIG. 22, the partitioning line 378 is positioned between the text information storage frame 376 and the title information storage frame 380.

Figure 23:
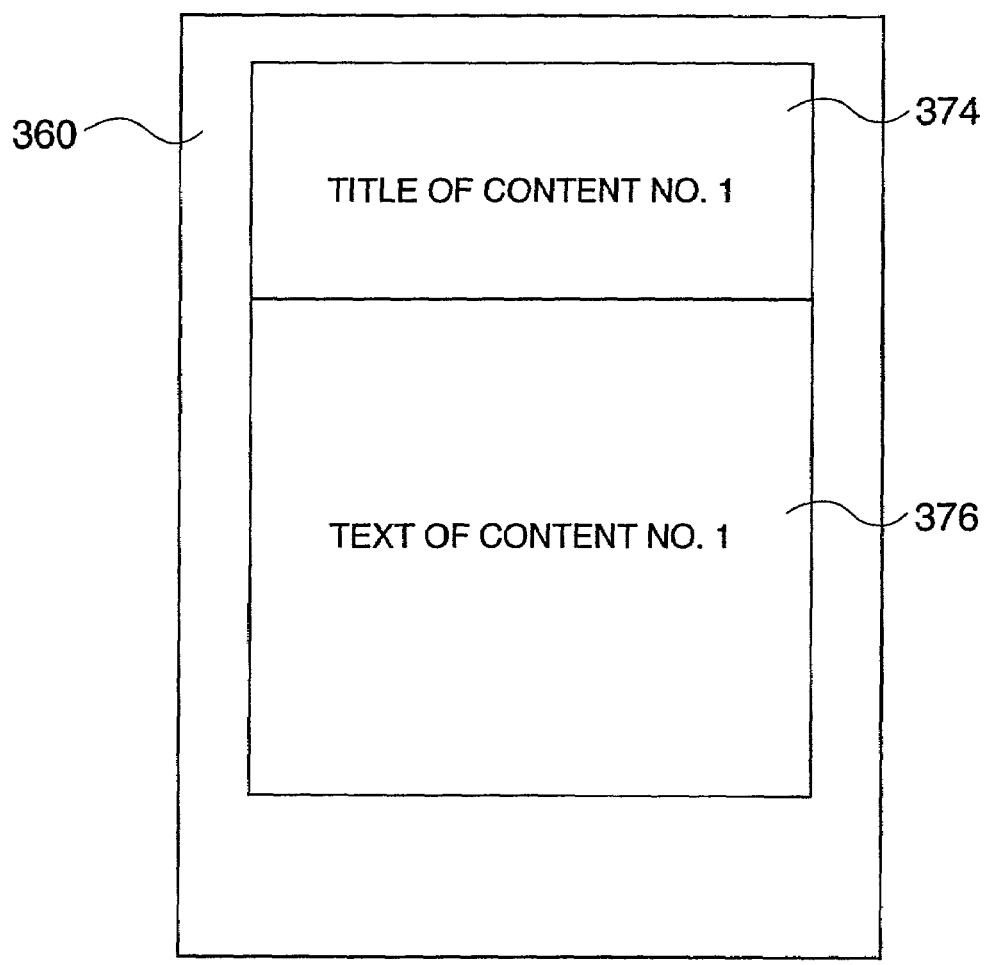
FIG. 23 illustrates another layout process based on the basic layout shown in FIG. 7.

A layout process using the basic layout shown in FIG. 7 is discussed in detail below with reference to FIG. 23. FIG. 23 illustrates another layout process based on the basic layout shown in FIG. 7.

In the layout process through steps S300-S310, the CPU 30 determines the location of a fixed line, the shape and location of fixed text information, and the shape and location of fixed image information, and selects a document to be arranged in the layout area 360 from digital contents retrieved in step S206 with reference to a predetermined priority order.

When title information is contained in the selected document, there is the title information storage frame 374 in the layout area 360, and the CPU 30 stores the title information contained in the selected document into the title information storage frame 374 through steps S500-S508 in a way similar to that described above. When the title is relatively long as shown in FIG. 23, the default title information storage frame 374 is changed downward in shape so that the title information just fits into the title information storage frame 374.

When text information is contained in the selected document, there is the text information storage frame 376 in the layout area 360, and the CPU 30 stores the text information contained in the selected document into the text information storage frame 376 through steps S700-S710 in a way similar to that described above. When the number of characters of the text information is large as shown in FIG. 23, the default text information storage frame 376 is changed downward in shape only up to reaching the state of not overlapping the title information storage frame 374. The text information storage frame 376 is then changed upward in shape so that the text information just fits into the text information storage frame 376.

Although the unprocessed information storage frames 380, and 382 are left in the layout area 360, the title information storage frame 380 and the text information storage frame 382 are deleted through steps S502 and S514, because the title information storage frame 380 overlaps the text information storage frame 376, the shape and location of which are already determined. Since the information storage frames 380 and 382 to be partitioned by the partitioning line 378 are no longer present in the layout area 360, the partitioning line 378 is deleted through steps S800, S802, and S806.

When a layout process is performed using the basic layout shown in FIG. 7, the layout results shown in FIGS. 22 and 23, if compared with each other, take over some of the basic layout shown in FIG. 7, although the two cases are different from each other in the amount of information to be posted.

When the output layout of the digital content is determined in this way, a destination address is read from the user profile table 300 through steps S222 and S224. The produced digital content is then delivered to the read destination address.

When an overflow takes place with an information storage frame unable to fully accommodate a flow object in the layout process, the record of the flow object that is overflowed for the first time is registered at the end of the flow management table 400 through steps S900-S904. The CPU 30 processes the unprocessed flow object through steps S400-S412, starting with the top of the flow management table 400. When an overflow takes place again with a new information storage frame unable to fully accommodate the flow object as a result of processing the unprocessed flow object, the CPU 30 registers the record of that flow object at the top of the flow management table 400 through steps S900, S902, and S906 as an exceptional case.

When there is still an unprocessed flow object after the layout area 360 of all pages of the layout definition file read in step S210 are processed, the CPU 30 repeats steps S1002-S1008 until unprocessed flow objects are no longer present. The layout area 360 of a new page is added, the process of determining the shape and location of a flow object storage frame is performed, and the process of determining the location of a partitioning line is performed.

When the text information storage frames 366 and 370 are not sufficient to store the text information using the basic layout shown in FIG. 6, the content delivery terminal 100 stores a flow object in a flow object storage frame belonging to a page coming later than the page of the text information storage frames 366 and 370.

When the text information is too large in quantity to be stored in the text information storage frames 366 and 370, the flow object is stored in another flow object storage frame. This arrangement reduces the possibility that the shape, etc., of the text information storage frames 366 and 370 is affected by the quantity of the text information. Regardless of the size of the text information, any text information storage frame posts the text information. In comparison with the conventional art, the present invention reduces the possibility that the layout intended by a designer is destroyed by the content of, the amount of, and the logical structure of the text information, and provides more freedom in the order of posting the information.

Since the latter portion of the text information (i.e., the flow object) is arranged on a page arranged behind the former portion of the text information, the digital content is produced in an output layout easy to see.

The content delivery terminal 100 in this embodiment registers a document number and an overflow position of the flow object in the flow management table 400 when the text information storage frames 366 and 370 are unable to fully store the text information using the basic layout shown in FIG. 6. To store the flow object in the flow object storage frame, the content delivery terminal 100 reads the document number and the overflow position from the flow management table 400, and stores the flow object in the flow object storage frame based on the read document number and overflow position. Since the flow object is regularly arranged to some degree, the digital content is produced in an output layout easier to see.

The content delivery terminal 100 in this embodiment performs a registration operation with respect to the flow management table 400 starting from the end thereof, and performs a reading operation from the top of the flow management table 400. Again, Since the flow object is more regularly arranged, the digital content is produced in an output layout even easier to see.

As for the same text information, the content delivery terminal 100 in this embodiment performs a registration operation from the top of the flow management table 400 at the second or more time of registering a flow object into the flow management table 400. Since the registration is performed with priority at the second or more time that the flow object of the same text information is registered, the content of the text information is prevented from straddling across a number of pages to some degree.

The content delivery terminal 100 in this embodiment sets a finish flag when the end of the flow object has been stored in the flow object storage frame. When the flow object is being stored in the flow object storage frame, the content delivery terminal 100 reads, from the flow management table 400, the document number and the overflow position of a record with the finish flag thereof cleared. In this way, the process of the flow object using the flow management table 400 becomes relatively easy.

If an unprocessed flow object is present when the content delivery terminal 100 in this embodiment arranges the document in all layout areas 360 defined by the layout definition file, the content delivery terminal 100 adds a new layout area 360, arranges a flow object storage frame in the added layout area 360, and stores the unprocessed flow object in the arranged flow object storage frame. This arrangement reduces missing digital contents to be posted.

The content delivery terminal 100 in this embodiment repeats the addition of the new layout area 360, the arrangement of the flow object, and the storage of the flow object until unprocessed flow objects are no longer present. This arrangement further reduces missing digital contents to be posted.

Focusing on the title information storage frame 362 and the image information storage frame 364 in the basic layout shown in FIG. 6, the content delivery terminal 100 in this embodiment determines the shape and location of the title information storage frame 362 based on the amount of the information to be posted to be stored in the title information storage frame 362, and determines the shape and location of the image information storage frame 364 that overlaps the title information storage frame 362, based on the determined shape and location of the title information storage frame 362.

In this way, the layout of the title information storage frame 362 is determined based on the layout in the layout definition file, and the layout of the image information storage frame 364 is determined based on the layout result of the title information storage frame 362 while referencing the layout in the layout definition file. The final layout result thus takes over some of the basic layout defined by the layout definition file. Since the shape and location of each of the title information storage frame 362 and the image information storage frame 364 are determined depending on the amount of the information to be posted, posting is carried out regardless of the amount of the information to be posted. In comparison with the conventional art, the present invention can reduce the possibility that the layout intended by a designer is destroyed by the content of, the amount of, and the logical structure of the text information, and provide more freedom in the order of posting the information.

It should be understood that the relationship discussed above is not limited to the one between the title information storage frames 362 and image information storage frame 364 in the basic layout shown in FIG. 6. The same relationship holds between the title information storage frame 362, the image information storage frames 364 and 368, the text information storage frame 366 and 370, and the flow object storage frame 372. As for the basic layout shown in FIG. 7, the same relationship holds between each of the title information storage frames 374 and 380, and each of the text information storage frames 376 and 382.

Focusing on the title information storage frame 362 and the image information storage frame 364 in the basic layout shown in FIG. 6, the layout definition file shown in FIG. 6 defines the two frames in the content delivery terminal 100 in this embodiment as being in the state that the image information storage frame 364 partly overlaps the title information storage frame 362 in the layout area 360.

Since this arrangement is expected to average the degree of modification of the image information storage frame 364 depending on the layout result of the title information storage frame 362, the possibility that the layout intended by a designer is destroyed is further reduced.

The above-referenced relationship is established not only between the title information storage frame 362 and the image information storage frame 364 in the basic layout shown in FIG. 6, but also between the title information storage frame 362 and each of the text information storage frames 366 and 370, between the image information storage frame 364 and the text information storage frame 366, between the text information storage frame 366 and the image information storage frame 368, and between the text information storage frame 370 and the flow object storage frame 372. In the basic layout shown in FIG. 7, the same relationship is equally established between the title information storage frame 374 and the text information storage frame 376, and between the title information storage frame 380 and each of the text information storage frames 376, and 382.

In the basic layout shown in FIG. 6, the content delivery terminal 100 in this embodiment determines the shape of each of the title information storage frame 362, the image information storage frames 364, and 368, the text information storage frames 366, and 370, and the flow object storage frame 372 so that each of these frames is shaped to the smallest possible size required to accommodate the information to be posted.

The information to be posted is thus efficiently stored in the information storage frames 362-372.

Focusing on the title information storage frame 362 and the image information storage frame 364 in the basic layout shown in FIG. 6, the image information storage frame 364 is deleted if the image information storage frame 364 is contained in the title information storage frame 362 as a result of determining the shape of the title information storage frame 362.

When the image information storage frame 364 is contained in the title information storage frame 362 and if the degree of modification of the image information storage frame 364 depending on the layout result of the title information storage frame 362 is considered large, the image information storage frame 364 is deleted. This arrangement further reduces the possibility that the layout intended by the designer is destroyed.

It should be understood that the relationship discussed above is not limited to the one between the title information storage frame 362 and the image information storage frame 364. The same relationship holds between the title information storage frame 362, the image information storage frames 364, and 368, the text information storage frames 366, and 370, and the flow object storage frame 372. As for the basic layout shown in FIG. 7, the same relationship holds between each of the title information storage frames 374, and 380, and each of the text information storage frames 376, and 382.

Further, focusing on the text information storage frame 376 and the title information storage frame 380 in the basic layout shown in FIG. 7, the content delivery terminal 100 in this embodiment sets the partitioning line 378 at a partitioning position between the text information storage frame 376 and the title information storage frame 380 when the title information storage frame 380 is found to be clear of the text information storage frame 376 as a result of determining the shapes and locations of the text information storage frame 376 and the title information storage frame 380. If the title information storage frame 380 overlaps the text information storage frame 376, the partitioning line 378 is deleted.

The text information storage frame 376 is partitioned from the title information storage frame 380 by the partitioning line 378 only when the text information storage frame 376 and the title information storage frame 380 are appropriately arranged. The digital content is produced in an output layout relatively easy to see.

The content delivery terminal 100 in this embodiment determines the shapes and locations of the information storage frames in the order of the title information storage frame 362, the image information storage frames 364 and 368, and the text information storage frames 366 and 370.

Since the layout is determined in the order of layout importance, the digital content is produced in an output layout relatively easy to see.

The content delivery terminal 100 in this embodiment deletes the title information storage frame 380 and the text information storage frame 382 relating thereto when the title information storage frame 380 overlaps another information storage frame, the shape and location of which have already been determined, in the basic layout shown in FIG. 7.

Since no information is posted at the expense of changing the position of the title information storage frame 380 that draws attention, the possibility of destroying the layout intended by the designer is further reduced.

The content delivery terminal 100 in this embodiment retrieves the digital content from the content registration data base DB 42, based on the user information in the user information registration data base DB 40.

Since unique information about a user and information designated by the user are referenced in the selection of the digital content, the digital content relatively satisfying to the user is thus produced.

The content delivery terminal 100 in this embodiment determines the output layout of the digital content based on the user information in the user information registration data base DB 40, before producing the digital content.

Since unique information about the user and information designated by the user are referenced in the determination of the output layout, the digital content relatively satisfying to the user is thus produced.

In the above-referenced embodiment, the text information can be handled as the flow object. Alternatively, handled as the flow object may be the title information or the image information. Since it is preferred that the title information and the image information are not overflowed respectively from the title information storage frame and the image information storage frame, it is occasionally better not to perform the overflow process, which is performed in the text information, from the standpoint of layout.

In the above-referenced embodiment, no indication of an overflow is displayed in an information storage frame when the frame is unable to fully store an object with a portion of the object overflowed therefrom. It should be understood that the present invention is not limited to this arrangement. Guide information serving as a reference for the flow object ("Continued To Page 3" when the flow object storage frame is on page 3, for example) may be stored in the information storage frame where the overflow occurred. Furthermore, link information indicating a link to the flow object storage frame storing the flow object may be stored together with the guide information. Upon clicking the guide information with a mouse, etc., the user, who has received the digital content, references the flow object by jumping to the location where the flow object is placed, in accordance with the link information.

In the above-referenced embodiment, no indication of an overflow is displayed in a flow object storage frame which stores the flow object when an information storage frame is unable to fully store the object with the portion of the object overflowed therefrom in the layout process. The present invention is not limited to this arrangement. Guide information serving as a reference for the object in the information storage frame where the overflow took place ("Continued From Page 1" when the information storage frame from which the overflow takes place is on page 1, for example) may be stored in the flow object storage frame storing the flow object. Furthermore, link information indicating a link to the information storage frame from which the overflow takes place may be stored together with the guide information. Upon clicking the guide information with a mouse, etc., the user, who has received the digital content, references the object by jumping to the location thereof in the information storage frame where the overflow took place, in accordance with the link information.

When the text information storage frames 366, and 370 are not sufficient to fully store the text information in the basic layout shown in FIG. 6 in accordance with this embodiment, the flow object is stored in a flow object storage frame of a page arranged behind the page bearing the text information storage frames 366, and 370. It should be understood that the present invention is not limited to this arrangement. The flow object may be stored in a flow object storage frame on the same page bearing the text information storage frames 366, and 370, or in a flow object storage frame on a page prior to the page bearing the text information storage frames 366, and 370.

In the above-reference embodiment, the shapes and locations of the information storage frames are determined in the order of the title information storage frame, the image information storage frame, and the text information storage frame. The present invention is not limited to this arrangement. The shapes and locations of the information storage frames are determined in any order. The determination order of the shapes and locations may be registered as the user information in the user profile table 300.

In the above-referenced embodiment, the shapes and locations of the information storage frames are dynamically determined during the layout process. The present invention is not limited to this arrangement. After information is stored in all information storage frames in the layout area 360, the shapes and locations of the information storage frames are then determined for layout.

The output layout of the digital content is determined based on the user information in the above-referenced embodiment. The present invention is not limited to this arrangement. The output layout of the digital content may be determined depending on the number of images contained in the digital content or depending on the amount of text information contained in the digital content. In this way, the output layout becomes relatively easy to see even if the number of images or the amount of text information contained in the digital content is large oror small.

The layout process in step S212 is performed in the content delivery terminal 100 in the above-referenced embodiment. The present invention is not limited to this arrangement. The layout process may be carried out in the user terminal 200. In this arrangement, the workload imposed on the content delivery terminal 100 is lightened.

In the above-referenced embodiment, the processes shown in the flow diagrams in FIG. 10 through FIG. 19 are performed by executing a control program stored beforehand in the ROM 32. The present invention is not limited to this. Before being executed, the control program representing these process steps may be read from a storage medium into the RAM 34.

The storage medium may be a semiconductor storage medium, such as a RAM, a ROM, etc, a magnetic storage medium such as an FD, an HD, etc, an optical storage medium such as a CD, a CDV, an LD, a DVD, etc., or a magnetooptical storage medium such as an MO, etc. The storage medium is thus any computer readable storage medium that permits data to be read electronically, magnetically, or optically.

In the above embodiment, the digital content production system and the digital content production program according to the present invention are implemented in a network system including the Internet 199. The present invention is not limited to this arrangement. Alternatively, the present invention may be applied to a so-called intranet that performs the same communication as that of the Internet 199. The present invention is not limited to a network that performs communication by the same method as that of the Internet 199, and may be applied to an ordinary network.

In the digital content production system and the digital content production process of the above embodiment of the present invention, the content delivery terminal 100 delivers digital contents such as news to the user terminal 200 as shown in FIG. 1. The present invention is not limited to this arrangement, and may be applied to other system configuration without departing from the scope and spirit of the present invention.

As described above, in accordance with the digital content production system of the present invention, the overflowed portion of the information to be posted is stored in another information storage frame when the information to be posted is too large to be stored in an information storage frame. This arrangement reduces the possibility that the shape, etc., of the text information storage frames is affected by the quantity of the information to be posted. Regardless of the size of the information to be posted, any information storage frame posts the information to be posted. In comparison with the conventional art, the present invention reduces the possibility that the layout intended by a designer is destroyed by the content of, the amount of, and the logical structure of the information to be posted, and provides more freedom in the order of posting the information.

In accordance with the digital content production system of the present invention, when the information to be posted is too large to be stored in the information storage frame, the latter portion of the information to be posted (i.e., the overflowed information to be posted) is arranged on a page behind the former portion of the information to be posted, and the digital content is thus produced in an output layout easy to see.

In accordance with the digital content production system of the present invention, the overflowed portion of the information to be posted is fairly regularly arranged, and the digital content is produced in an output layout easier to see.

In accordance with the digital content production system of the present invention, the overflowed portion of the information to be posted is more regularly arranged, and the digital content is produced in an output layout easier to see.

Since the registration is performed with priority at the second or more time that the overflowed portion of the same information to be posted is registered in accordance with the digital content production system of the present invention, the content of the information to be posted is prevented from straddling across a number of pages to some degree.

In accordance with the digital content production system of the present invention, the process of the overflowed portion of the information to be posted using the flow management table is relatively easily performed.

The digital content production system of the present invention, reduces missing digital contents to be posted.

The digital content production system of the present invention, further reduces missing digital contents to be posted.

The digital content production system of the present invention, references unique information about a user and information designated by a user in the selection of the digital content, and thereby the digital content relatively satisfying to the user is thus produced.

The digital content production system of the present invention, references unique information about a user and information designated by a user in the determination of the output layout, the digital content in the output layout relatively satisfying to the user is thus produced.

On the other hand, the digital content production program of the present invention, provides the same advantages as those of the digital content production system as described above.

While this invention has been described in conjunction with the specific embodiments thereof, it is evident that many alternatives, modifications and variations will be apparent to those skilled in the art. Accordingly, preferred embodiments of the invention as set forth therein are intended to be illustrative not limiting. There are changes that may be made without departing from the spirit and scope of the invention.

What is claimed is:

1. A digital content production system, comprising:
    a content storage device that stores registered digital contents;
    a content selection device that selects a digital contents for arrangement in the content storage device; and
    a content production device that produces a digital content for output by determining an output layout of the digital contents for arrangement selected by the content selection device,
    the content production device producing the digital content for output by arranging information to be posted forming the digital contents for arrangement in a layout area in accordance with a predetermined frame,
    the content production device producing the digital content for output by storing the information to be posted in a plurality of information storage frames, arranged in the layout area, for containing the information to be posted, the plurality of information storage frames including a first and second storage frame defined so that at least a part of the first and second storage frame overlap one another,
    when a size of the first information storage frame is determined based on information to be posted, a size of the second information storage frame being adjusted so that it no longer overlaps the first information storage frame,
    the plurality of information storage frames including an overflowed-information storage frame dedicated to storing an overflowed portion of the information to be posted therewithin, and
    when one of the information storage frames is not sufficient to store a corresponding section of the information to be posted, a portion of the corresponding information to be posted that cannot be stored in the corresponding information storage frame is stored into the overflowed-information storage frame, the overflowed-information storage frame capable of being located on a page other than a same page or a next page from the corresponding information storage frame.

2. A digital content production system according to claim 1, the content production device producing the digital content for output containing a plurality of layout areas on a one area per page basis by storing the information to be posted in the plurality of information storage frames, and
    wherein, when the information storage frames are not sufficient to store the information to be posted, an overflowed portion of the information to be posted is stored into another information storage frame on a page different from a page to which the information storage frames belong.

3. A digital content production system according to claim 2, wherein, when the information storage frames are not sufficient to store the information to be posted, an overflowed portion of the information to be posted is stored into another information storage frame belonging to a page arranged behind a page to which the information storage frames belong.

4. A digital content production system according to claim 1, further comprising:
    a layout definition information storage device that stores layout definition information that defines a state in which the plurality of information storage frames are arranged in the layout area,
    wherein, if an unprocessed overflowed portion of the information to be posted not stored in the information storage frames is still present when the information to be posted is arranged in all layout areas defined by the layout definition information stored in the layout definition information storage device, the content production device adds a new layout area, arranges the another information storage frame in the newly added layout area, and stores the unprocessed overflowed portion of the information to be posted in the arranged information storage frame.

5. A digital content production system according to claim 4, the content production device repeating the addition, the arrangement, and the storage until no unprocessed overflowed portion of the information to be posted is present.

6. A digital content production system according to claim 1, the content production device storing the overflowed portion of the information to be posted in a dedicated overflowed-information storage frame before storing the information to be posted in the plurality of information storage frames other than a dedicated overflowed-information storage frame on the same page.

7. A digital content production system according to claim 1, further comprising:
a user information storage device that stores user information relating to a user,
the content selection device determining the digital contents for arrangement in the content storage device in accordance with the user information in the user information storage device.

8. A digital content production system according to claim 1, further comprising:
a user information storage device that stores user information relating to a user,
the content production device determining an output layout of the digital contents for arrangement selected by the content selection device, in accordance with the user information in the user information storage device.

9. A digital content production program which enables the digital content production system according to claim 1, including a computer system to perform a process to be achieved by the content production device,
the content production device producing the digital content for output by storing the information to be posted in the plurality of information storage frames for storing the information to be posted, the information storage frames arranged in the layout area, and when the information storage frames are not sufficient to store the information to be posted, an overflowed portion of the information to be posted not stored in the information storage frames is stored into another information storage frame different from the information storage frames.

10. A digital content production system, comprising:
a content storage device that stores registered digital contents;
a content selection device that selects a digital contents for arrangement in the content storage device; and
a content production device that produces a digital content for output by determining an output layout of the digital contents for arrangement selected by the content selection device, the content production device producing the digital content for output by arranging information to be posted forming the digital contents for arrangement in a layout area in accordance with a predetermined frame, and the content production device producing the digital content for output by storing the information to be posted in a plurality of information storage frames, arranged in the layout area, for containing the information to be posted, and when the information storage frames are not sufficient to store the information to be posted, a portion of the information to be posted that cannot be stored in the information storage frames is stored into another information storage frame different from the information storage frames, the content production device producing the digital content for output containing a plurality of layout areas on a one area per page basis by storing the information to be posted in the plurality of information storage frames, and, when the information storage frames are not sufficient to store the information to be posted, an overflowed portion of the information to be posted is stored into another information storage frame on a page different from a page to which the information storage frames belong;
a table storage device that stores a flow management table that manages the overflowed portion of the information to be posted,
the flow management table registering, per overflowed portion, identification information for identifying the overflowed portion of the information to be posted and front position information for identifying front position of the overflowed portion of the information to be posted with the identification information associated with the front position information,
wherein, when the information storage frames are not sufficient to store the information to be posted, the content production device registers the identification information and the front position information of the overflowed portion of the information to be posted in the flow management table,
wherein, when the overflowed portion of the information to be posted is stored into the another information storage frame, the identification information and the front position information are read from the flow management table, and the overflowed portion is stored into the another information storage frame belonging to the different page, based on read identification information and read front position information, and
wherein the content production device performing a registration operation starting from an end of the flow management table while performing a reading operation starting from a top of the flow management table.

11. A digital content production system according to claim 10, the content production device performing a registration operation from the top of the flow management table at a second or subsequent time of registering the overflowed portion of same information to be posted into the flow management table.

12. A digital content production system according to claim 10, the flow management table registering finish information indicating whether the storage of the overflowed portion is completed, in addition to the identification information and the front position information, with finish information associated with the identification information and the front position information,
the content production device setting the finish information into a state that represents that the storage of the overflowed portion is completed when the end of the overflowed portion has been stored into the another information storage frame, and
wherein, when the overflowed portion is stored into the another information storage frame, the identification information and the front position information, corresponding to the finish information yet to indicate a state that the storage of the overflowed portion is completed, are read from the flow management table.

13. A digital content production system, comprising:
a content storage device that stores registered digital contents;
a content selection device that selects a digital contents for arrangement in the content storage device; and a content production device that produces a digital content for output by determining an output layout of the digital contents for arrangement selected by the content selection device, the content production device producing the digital content for output by arranging information to be posted forming the digital contents for arrangement in a layout area in accordance with a predetermined frame, and the content production device producing the digital content for output by storing the information to be posted in a plurality of information storage frames, arranged in the layout area, for containing the information to be posted, and when the information storage frames are not sufficient to store the information to be posted, a portion of the information to be posted that cannot be stored in the information storage frames is stored into another information storage frame different from the information storage frames, the content production device producing the digital content for output containing a plurality of layout areas on a one area per page basis by storing the information to be posted in the plurality of information storage frames, and, when the information storage frames are not sufficient to store the information to be posted, an overflowed portion of the information to be posted is stored into another information storage frame on a page different from a page to which the information storage frames belong;

a table storage device that stores a flow management table that manages the overflowed portion of the information to be posted;

the flow management table registering, per overflowed portion, identification information for identifying the overflowed portion of the information to be posted and front position information for identifying front position of the overflowed portion of the information to be posted with the identification information associated with the front position information, wherein, when the information storage frames are not sufficient to store the information to be posted, the content production device registers the identification information and the front position information of the overflowed portion of the information to be posted in the flow management table, and wherein, when the overflowed portion of the information to be posted is stored into the another information storage frame, the identification information and the front position information are read from the flow management table, and the overflowed portion is stored into the another information storage frame belonging to the different page, based on read identification information and read front position information;

the plurality of information storage frames including a first and second storage frame defined so that at least a part of the first and second storage frame overlap one another; and when a size of the first information storage frame is determined based on information to be posted, a size of the second information storage frame being adjusted so that it no longer overlaps the first information storage frame.

* * * * *